(12) United States Patent
Murgatroyd et al.

(10) Patent No.: US 10,301,474 B2
(45) Date of Patent: May 28, 2019

(54) HIGH WET FAST DISPERSE DYES AND MIXTURES THEREOF

(71) Applicant: DyStar Colours Distribution GmbH, Raunheim (DE)

(72) Inventors: Adrian Murgatroyd, Frankfurt (DE); Manfred Hoppe, Kürten (DE); Clemens Grund, Hattersheim (DE)

(73) Assignee: DyStar Colours Distribution GmbH (DE)

( * ) Notice: Subject to any disclaimer, the term of this patent is extended or adjusted under 35 U.S.C. 154(b) by 0 days.

(21) Appl. No.: 15/509,571

(22) PCT Filed: Sep. 10, 2015

(86) PCT No.: PCT/EP2015/070764
§ 371 (c)(1),
(2) Date: Mar. 8, 2017

(87) PCT Pub. No.: WO2016/041849
PCT Pub. Date: Mar. 24, 2016

(65) Prior Publication Data
US 2017/0306154 A1  Oct. 26, 2017

(30) Foreign Application Priority Data

Sep. 15, 2014 (EP) .................... 14184750

(51) Int. Cl.
*C09B 29/08* (2006.01)
*C09B 29/36* (2006.01)
*C09D 11/328* (2014.01)
*C09B 67/00* (2006.01)
*D06P 1/04* (2006.01)
*C09B 29/42* (2006.01)
*C09B 67/22* (2006.01)

(52) U.S. Cl.
CPC ........ *C09B 29/0808* (2013.01); *C09B 29/081* (2013.01); *C09B 29/083* (2013.01); *C09B 29/0816* (2013.01); *C09B 29/3634* (2013.01); *C09B 67/0051* (2013.01); *C09D 11/328* (2013.01); *D06P 1/04* (2013.01)

(58) Field of Classification Search
CPC .............. C09B 29/0808; C09B 29/083; C09B 67/0051; C09D 11/328; D06P 1/04
See application file for complete search history.

(56) References Cited

U.S. PATENT DOCUMENTS

| | | | |
|---|---|---|---|
| 2,311,033 A | * | 2/1943 | Dickey .................. C09B 29/06 534/845 |
| 4,360,587 A | * | 11/1982 | Haessner ............ C09B 29/0003 430/332 |
| 4,379,819 A | * | 4/1983 | Lenoir ..................... G03C 7/29 430/17 |
| 4,389,216 A | | 6/1983 | Bergmann et al. |
| 4,795,807 A | | 1/1989 | Bühler et al. |
| 5,420,254 A | | 5/1995 | Altermatt et al. |
| 2007/0214989 A1 | | 9/2007 | Arnold et al. |

FOREIGN PATENT DOCUMENTS

| | | |
|---|---|---|
| CA | 1101154 A | 5/1981 |
| DE | 2818653 A1 | 11/1978 |
| DE | 3112427 A1 | 10/1982 |
| DE | 4335261 A1 | 4/1994 |
| EP | 0240902 A2 | 10/1987 |
| EP | 1735385 A1 | 12/2006 |
| GB | 2020680 A | 11/1979 |
| GB | 2030169 A | 4/1980 |
| WO | WO-2005040283 A2 | 5/2005 |
| WO | WO-2005056690 A1 | 6/2005 |
| WO | WO-2005097913 A1 | 10/2005 |
| WO | WO-2014040810 A1 | 3/2014 |

OTHER PUBLICATIONS

Peters, A.T. Substituent effects on the colour, dyeing and fastness properties of 4-phenylazo-1-naothylamines and of 2-acetylamino-5-methoxy-4-N-b-cyanoethyl-N-b-hydroxyethylaminoazobenzene, JSDC vol. 104, Sep. 1988, p. 344-348.*
Arient et al. Pyrene derivatives. III. Acylamino derivatives of pyrenequinone. Chemicky Prumysl (1964), 14(7), 357-9.*
Matsui et al. Halobenzene reactive dyes. IV. Reactive dyes derived from 1,3-difluoro-4,6-dinitrobenzene. Kogyo Kagaku Zasshi (1964), 67(1), 97-102.*
International Search Report for PCT/EP2015/070764 dated Jan. 4, 2016.
Written Opinion of the International Searching Authority for PCT/EP2015/070764 dated Jan. 4, 2016.
Berbalk, H., et al., "r-(5-Fluor-2,4-dinitro-1-phenylazo)-N,N-dimethylanilin, ein neues Reagens zur flüssigchromatographischen Bestimmung von Phenolen", Monatshefte für Chemie, 1980, vol. 111, pp. 529-533.

* cited by examiner

*Primary Examiner* — Amina S Khan
(74) *Attorney, Agent, or Firm* — Drinker Biddle & Reath LLP

(57) ABSTRACT

Dyes of formula (1)

(I)

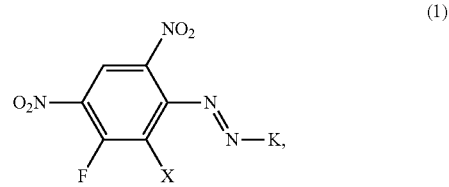

their production and their use are described.

32 Claims, No Drawings

HIGH WET FAST DISPERSE DYES AND MIXTURES THEREOF

CROSS-REFERENCE TO RELATED APPLICATIONS

This application is a national stage application (under 35 U.S.C. § 371) of PCT/EP2015/070764, filed Sep. 10, 2015, which claims benefit of European Application No. 14184750.9, filed Sep. 15, 2014, both of which are incorporated herein by reference in their entirety.

This invention relates to disperse azo dyes and their mixtures.

Disperse dyes with improved fastness properties, especially wash fastness are of growing interest.

Disperse dyes having 2,4,6-Di-nitro-halogen diazo-component (a) as structural element are well known and are the basis of most red and especially violet and blue disperse dyes and mixtures using those dyes.

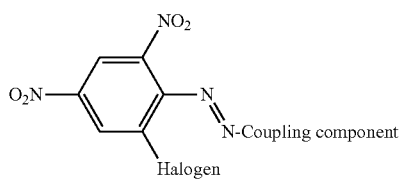

Dyes according to (a) and their preparation are known and described in various patents e.g. GB 2030169, DE 4335261, DE 3112427, DE 2818653, WO 2005/056690 or EP 0 240 902 but are having deficits in light- and wet-fastness properties. Dyes of formula (a) where the halogen is fluoro are rarely exemplified.

The substitution pattern 2,4,5-Dinitro-halogen according to (b) is also known e.g. from WO 2005/056690 or WO 2005/040283. In combination with special coupling components they may result in dyes with improved fastness properties.

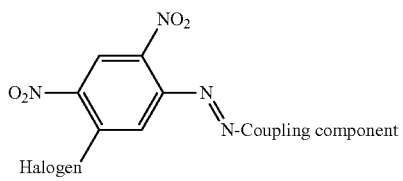

Still though there remains a need for disperse dyes, which provide dyeings of improved fastness properties of dyed polyester or its blends with other fibres such as cellulose, nylon, elastane and wool.

Surprisingly it was found that 2,4,5-Dinitro-fluoro-aniline as a diazo component delivers disperse azo dyes and their mixtures, which provide dyeings having improved fastness properties especially wet- and light-fastness of dyed polyester or its blends with other fibres and which dyes additionally have a high affinity to the fibre that is reflected in good built up properties. About 35 years ago one member of this group of compounds, having the following formula:

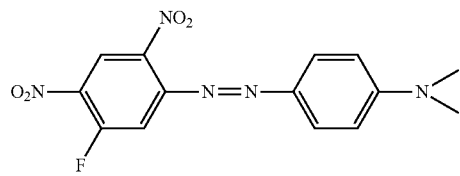 [SMILES: CN(C)c1ccc(N=Nc2cc(F)c([N+](=O)[O-])cc2[N+](=O)[O-])cc1]

has been disclosed in *Monatshefte für Chemie* 111, (1980), p. 529-533 as an intermediate in the production of a compound, which can be used for the TLC determination of phenols.

The present invention is directed to dyes of formula (I) and mixtures thereof

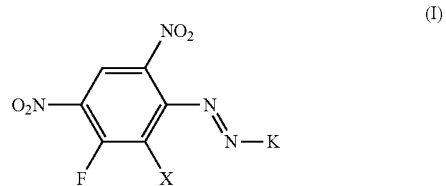

wherein
X is hydrogen or halogen and
K is an aromatic or heteroaromatic coupling component and wherein the dye:

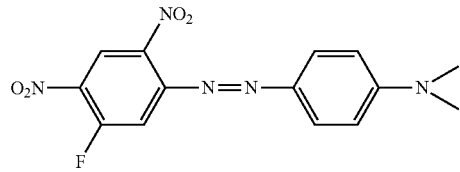 [SMILES: CN(C)c1ccc(N=Nc2cc(F)c([N+](=O)[O-])cc2[N+](=O)[O-])cc1]

is excluded.

Preferably K is selected from the group consisting of aminobenzene, napht-1-yl, napht-2-yl, quinoline or any other N-heterocyclic fused ring system, each of which may be unsubstituted or substituted, and a phenol- or naphthol-radical, each of which may be unsubstituted or substituted.

In general dyes are preferred where X is not hydrogen. However, many preferred structures exist, where X is hydrogen. Thus in the following, where the preferred embodiments are described in detail e.g. as "X is hydrogen or halogen" or "X is hydrogen, bromo or chloro" such statement refers to all different subgroups, i.e. the subgroup with X being hydrogen, the subgroup with X not being hydrogen but anything else and the subgroup, where X is whatever is mentioned, e.g. halogen.

Preferred are dyes of formula (I), wherein
X is hydrogen or halogen,
K is a radical of formula (2)

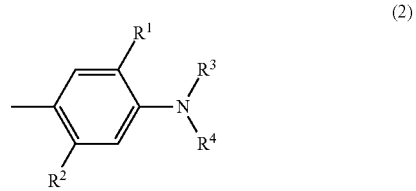

wherein independent from each other $R^1$ is hydrogen, unsubstituted or substituted $C_1$-$C_4$-alkyl, unsubstituted or substituted $C_1$-$C_4$-alkoxy, chloro, bromo, benzyloxy or —O—$(CH_2)_n$-$A^1$-$C_1$-$C_4$-alkyl, $R^2$ is hydrogen, hydroxyl, unsubstituted or substituted $C_1$-$C_4$-alkyl, unsubstituted $C_1$-$C_4$-alkoxy, chloro, bromo, acyloxy, acylamino (e.g. NHCO—$(CH_2)_n$-$A^1$-$C_1$-$C_4$-alkyl) or alkylsulfonylamino (e.g. NHSO$_2$—$(CH_2)_n$-$A^1$-$C_1$-$C_4$-alkyl), wherein n is 1 to 4 and $A^1$ is O, O—CO, O—CO—O or CO—O and $R^3$ and $R^4$ is unsubstituted or substituted $C_1$-$C_4$-alkyl, unsubstituted or substituted phenyl, unsubstituted or substituted benzyl or $R^1$ and $R^3$ together form a 5- or 6-membered aliphatic, heteroaliphatic, aromatic or heteroaromatic ring, which 5- or 6-membered ring is unsubstituted or substituted.

Dyes, wherein X is hydrogen form one preferred group of dyes. Dyes, wherein X is not hydrogen form another preferred group of dyes. Still another preferred group of dyes are those, wherein X is halogen and Br or Cl in particular.

More preferred are dyes of the formula (II)

(II)

wherein independent of each other

X is hydrogen, chloro or bromo, $R^1$ is hydrogen, hydroxyl, $C_1$-$C_4$-alkyl, bromo, chloro or $C_1$-$C_4$-alkoxy, $R^2$ is hydrogen, hydroxyl, carboxy, $C_1$-$C_4$-alkyl, $C_1$-$C_4$-alkoxy, halogen, acyloxy, acylamino (e.g. NHCO—$C_1$-$C_4$-alkyl, NHCO-aryl, NHCO-benzyl) or sulfonylamino (e.g. NHSO$_2$—$C_1$-$C_4$-alkyl), $R^3$ and $R^4$ is hydrogen, $C_1$-$C_4$-alkyl, $(CH_2)_n$-phenyl, $CH_2$=$CH$—$CH_2$, $(CH_2)_n$—OH, $(CH_2)_n$—O—$(C_1$-$C_4)$-alkyl, $(CH_2)_n$—O-phenyl, $(CH_2)_n$—O-benzyl, $(CH_2)_n$—O—$(CH_2)_m$—OH, $(CH_2)_n$—O—$(CH_2)_m$—O—$(C_1$-$C_4)$-alkyl, $(CH_2)_n$—O—$(CH_2)_m$—O-phenyl, $(CH_2)_n$—O—$(CH_2)_m$—O-benzyl, $(CH_2)_n$—COOH, $(CH_2)_n$—COO—$(C_1$-$C_4)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1$-$C_4)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1$-$C_4)$-alkyl, $(CH_2)_n$—O—CO-phenyl, $(CH_2)_n$—O—CO-benzyl, COO—$(CH_2)_n$-2-furfuryl, COO—$(CH_2)_n$-2-dehydropyranyl, $(CH_2)_m$—O—$(CH_2)_n$-2-furfuryl, $(CH_2)_m$—O—$(CH_2)_n$-2-dehydropyranyl, $CHR^2$—$(CH_2)_p$—$(C_1$-$C_4)$-alkyl, $CHR^2$—$(CH_2)_p$ phenyl, $CHR^2$—$CH$=$CH_2$, $CHR^2$—$(CH_2)_p$—OH, $CHR^2$—$(CH_2)_p$—O—$(C_1$-$C_4)$-alkyl, $CHR^2$—$(CH_2)_p$—O-phenyl, $CHR^2$—$(CH_2)_p$—O-benzyl, $CHR^2$—$(CH_2)_p$—O—$(CH_2)_m$—OH, $CHR^2$—$(CH_2)_p$—O—$(CH_2)_m$—O—$(C_1$-$C_4)$-alkyl, $CHR^2$—$(CH_2)_p$—O—$(CH_2)_m$—O-phenyl, $CHR^2$—$(CH_2)_p$—O—$(CH_2)_m$—O-benzyl, $(CH_2)_n$—O—$(CH_2)_p$—$(CHR^2)_m$—O—$(C_1$-$C_4)$-alkyl, $(CH_2)_n$—O—$(CH_2)_p$—$(CHR^2)_m$—O-phenyl, $(CH_2)_n$—O—$(CH_2)_p$—$(CHR^2)_m$—O-benzyl, $CHR^2$—$(CH_2)_p$—COOH, $CHR^2$—$(CH_2)_p$—COO—$(C_1$-$C_4)$-alkyl, $CHR^2$—$(CH_2)$—COO-phenyl, $CHR^2$—$(CH_2)_p$—COO-benzyl, $CHR^2$—$(CH_2)_p$—CN, $CHR^2$—$(CH_2)_p$—COO$(CH_2)_m$—CO—$(C_1$-$C_4)$-alkyl, $CHR^2$—$(CH_2)_p$—COO$(CH_2)_m$—CO-phenyl, $CHR^2$—$(CH_2)_p$—COO$(CH_2)_m$—CO-benzyl, $(CH_2)_n$—COO$(CH_2)_p$—$(CHR^2)_m$—CO—$(C_1$-$C_4)$-alkyl, $CHR^2$—$(CH_2)_p$—O—CO—$(C_1$-$C_4)$-alkyl, $CHR^2$—$(CH_2)_p$—O—CO-phenyl, $CHR^2$—$(CH_2)_p$—O—CO-benzyl, $CHR^2$—$(CH_2)_p$-2-furfuryl, COO—$CHR^2$—$(CH_2)_p$-2-dehydropyranyl, $CHR^2$—$(CH_2)_p$—O—$(CH_2)_n$-2-furfuryl, $CHR^2$—$(CH_2)_p$—O—$(CH_2)_n$-2-dehydropyranyl, whereby all benzyl and phenyl rings can be substituted by $C_1$-$C_4$-alkyl, $C_1$-$C_4$-alkoxy, halogen, nitro, cyano or $COOR^2$ n is 1 to 4, m is 1 to 4 and p is 0 to 3.

Even more preferred are dyes of formula (II) wherein independent from each other X is hydrogen, chloro or bromo, $R^1$ is hydrogen, methyl or methoxy, $R^2$ is hydrogen, hydroxy, COOH, COO—$C_1$-$C_2$-alkyl, $C_1$-$C_2$-alkyl, $C_1$-$C_2$-alkoxy, chloro, bromo, —NHCO—$C_1$-$C_2$-alkyl, —NHCO-aryl, —NHCO-benzyl, —NHSO$_2$—$C_1$-$C_2$-alkyl or —NHSO$_2$-aryl, $R^3$ and $R^4$ is hydrogen, $C_1$-$C_2$-alkyl, $(CH_2)$-phenyl, $CH_2$=$CH$=$CH_2$, $(CH_2)_2$—O—$(C_1$-$C_2)$-alkyl, $(CH_2)_2$—O-phenyl, $(CH_2)_2$—O-benzyl, $(CH_2)_2$—O—$(CH_2)_m$—O—$(C_1$-$C_2)$-alkyl, $(CH_2)_2$—O—$(CH_2)_m$—O-phenyl, $(CH_2)_2$—O—$(CH_2)_m$—O-benzyl, $(CH_2)_n$—COO—$(C_1$-$C_2)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1$-$C_2)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1$-$C_2)$-alkyl, $(CH_2)_n$—O—CO-phenyl, $(CH_2)_n$—O—CO-benzyl, COO—$(CH_2)_n$-2-furfuryl, COO—$(CH_2)_n$-2-dehydropyranyl, $(CH_2)_m$—O—$(CH_2)_n$-2-furfuryl, $(CH_2)_m$—O—$(CH_2)_n$-2-dehydropyranyl, $CHR^2$—$CH$=$CH_2$, $CHR^2$—$(CH_2)_p$—O—$(C_1$-$C_2)$-alkyl, $CHR^2$—$(CH_2)_p$—O-phenyl, $CHR^2$—$(CH_2)_p$—O-benzyl, $CHR^2$—$(CH_2)_p$—O—$(CH_2)_m$—O—$(C_1$-$C_2)$-alkyl, $CHR^2$—$(CH_2)_p$—O—$(CH_2)_m$—O-phenyl, $CHR^2$—$(CH_2)_p$—O—$(CH_2)_m$—O-benzyl, $CHR^2$—$(CH_2)_p$—COO—$(C_1$-$C_2)$-alkyl, $CHR^2$—$(CH_2)_p$—COO-phenyl, $CHR^2$—$(CH_2)_p$—COO-benzyl, $CHR^2$—$(CH_2)_p$—CN, $CHR^2$—$(CH_2)_p$—COO$(CH_2)_m$—CO—$(C_1$-$C_2)$-alkyl, $CHR^2$—$(CH_2)_p$—COO$(CH_2)_m$—CO-phenyl, $CHR^2$—$(CH_2)_p$—COO$(CH_2)_m$—CO-benzyl, $CHR^2$—$(CH_2)_p$—O—CO—$(C_1$-$C_2)$-alkyl, $CHR^2$—$(CH_2)_p$—O—CO-phenyl or $CHR^2$—$(CH_2)_p$—O—CO-benzyl, n is 1 or 2, m is 1 or 2 and p is 0 or 1.

And most preferred are dyes of the formula (II), wherein independent from each other X is hydrogen, chloro or bromo, $R^1$ is hydrogen, methyl or methoxy, $R^2$ is hydrogen, hydroxy, COOH, COO—$(C_1$-$C_2)$-alkyl, $(C_1$-$C_2)$-alkyl, chloro, bromo, —NHCO—$(C_1$-$C_2)$-alkyl, —NHSO$_2$—$(C_1$-$C_2)$-alkyl, $R^3$ and $R^4$ is hydrogen, $C_1$-$C_2$-alkyl, $(CH_2)$-phenyl, $CH_2$=$CH$=$CH_2$, $(CH_2)_2$—O—$(C_1$-$C_2)$-alkyl, $(CH_2)_2$—O-phenyl, $(CH_2)_2$—O-benzyl, $(C_2)_2$—O—$(CH_2)_m$—O—$(C_1$-$C_2)$-alkyl, $(CH_2)_n$—COO—$(C_1$-$C_2)$-alkyl, $(CH_2)_n$—COO-phenyl, $(CH_2)_n$—COO-benzyl, $(CH_2)_n$—CN, $(CH_2)_n$—COO$(CH_2)_m$CO—$(C_1$-$C_2)$-alkyl, $(CH_2)_n$—COO$(CH_2)_m$—CO-phenyl, $(CH_2)_n$—O—CO—$(C_1$-$C_2)$-alkyl, $(CH_2)_n$—O—CO-phenyl, COO—$(CH_2)_n$-2-furfuryl, $(CH_2)_m$—O—$(CH_2)_n$-2-furfuryl, $CHR^2$—$(CH_2)_p$—COO—$(C_1$-$C_2)$-alkyl, $CHR^2$—$(CH_2)$—O—$(C_1$-$C_2)$-alkyl, $CHR^2$—$(CH_2)_p$—COO $(CH_2)_p$—CO—$(C_1$-$C_2)$-alkyl, CHR$^2$—$(CH_2)_p$—COO$(CH_2)_m$—CO-phenyl, CHR$^2$—$(CH_2)_p$—O—CO—$(C_1$-$C_2)$-alkyl or CHR$^2$—$(CH_2)_p$—O—CO-phenyl,
n is 1 or 2,
m is 1 or 2 and
p is 0 or 1.

Another preferred embodiment of the present invention are dyes of formula (III)

(III)

wherein independent from each other
X is hydrogen, chloro or bromo,
R$^1$ is hydrogen, $C_1$-$C_4$-alkyl, bromo, chloro or $C_1$-$C_4$-alkoxy,
R$^5$ is hydrogen or $C_1$-$C_4$-alkyl,
R$^3$ and R$^4$ is hydrogen, $C_1$-$C_4$-alkyl, $(CH_2)_n$-phenyl, $CH_2$—CH=CH$_2$, $(CH_2)_n$—OH, $(CH_2)_n$—O—$(C_1$-$C_4)$-alkyl, $(CH_2)_n$—O-phenyl, $(CH_2)_n$—O-benzyl, $(CH_2)_n$—O—$(CH_2)_m$—OH, $(CH_2)_n$—O—$(CH_2)_m$—O—$(C_1$-$C_4)$-alkyl, $(CH_2)_n$—O—$(CH_2)_m$—O-phenyl, $(CH_2)_n$—O—$(CH_2)_m$—O-benzyl, $(CH_2)_n$—COOH, $(CH_2)_n$—COO—$(C_1$-$C_4)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1$-$C_4)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1$-$C_4)$-alkyl, $(CH_2)_n$—O—CO-phenyl, $(CH_2)_n$—O—CO-benzyl, COO—$(CH_2)_n$-2-furfuryl, COO—$(CH_2)_n$-2-dehydropyranyl, $(CH_2)_m$—O—$(CH_2)_n$-2-furfuryl, $(CH_2)_m$—O—$(CH_2)_n$-2-dehydropyranyl, CHR$^2$—$(CH_2)_p$—$(C_1$-$C_4)$-alkyl, CHR$^2$—$(CH_2)_p$-phenyl, CHR$^2$—CH=CH$_2$, CHR$^2$—$(CH_2)_p$—OH, CHR$^2$—$(CH_2)_p$—O—$(C_1$-$C_4)$-alkyl, CHR$^2$—$(CH_2)_p$—O-phenyl, CHR$^2$—$(CH_2)_p$—O-benzyl, CHR$^2$—$(CH_2)_p$—O—$(CH_2)_m$—OH, CHR$^2$—$(CH_2)_p$—O—$(CH_2)_m$—OH, CHR$^2$—$(CH_2)_p$—O—$(CH_2)_m$—O—$(C_1$-$C_4)$-alkyl, CHR$^2$—$(CH_2)_p$—O—$(CH_2)_m$—O-phenyl, CHR$^2$—$(CH_2)_p$—O—$(CH_2)_m$—O-benzyl, CHR$^2$—$(CH_2)_p$—COOH, CHR$^2$—$(CH_2)_p$—COO—$(C_1$-$C_4)$-alkyl, CHR$^2$—$(CH_2)_p$—COO-phenyl, CHR$^2$—$(CH_2)_p$—COO-benzyl, CHR$^2$—$(CH_2)_p$—CN, CHR$^2$—$(CH_2)_p$—COO$(CH_2)_m$—CO—$(C_1$-$C_4)$-alkyl, CHR$^2$—$(CH_2)_p$—COO$(CH_2)_m$—CO-phenyl, CHR$^2$—$(CH_2)_p$—COO$(CH_2)_m$—CO-benzyl, $(CH_2)_n$—COO$(CH_2)_p$—(CHR$^2)_m$—CO—$(C_1$-$C_4)$-alkyl, $(CH_2)_n$—O—$(CH_2)_p$—(CHR$^2)_m$—O—$(C_1$-$C_4)$-alkyl, $(CH_2)_n$—O—$(CH_2)_p$—(CHR$^2)_m$—O-phenyl, $(CH_2)_n$—O—$(CH_2)_p$—(CHR$^2)_m$—O-benzyl, CHR$^2$—$(CH_2)_p$—O—CO—$(C_1$-$C_4)$-alkyl, CHR$^2$—$(CH_2)_p$—O—CO-phenyl, CHR$^2$—$(CH_2)_p$—O—CO-benzyl, COO—CHR$^2$—$(CH_2)_p$-2-furfuryl, COO—CHR$^2$—$(CH_2)_p$-2-dehydropyranyl, CHR$^2$—$(CH_2)_p$—O—$(CH_2)_n$-2-furfuryl or CHR$^2$—$(CH_2)_p$—O—$(CH_2)_n$-2-dehydropyranyl, whereby all benzyl and phenyl rings can be substituted by $(C_1$-$C_4)$-alkyl, $(C_1$-$C_4)$-alkoxy, halogen, nitro, cyano or COOR$^2$,
n is 1 to 4,
m is 1 to 4 and
p is 0 to 3.

More preferred are dyes of the formula (III), wherein independent from each other
X is hydrogen, chloro or bromo,
R$^1$ is hydrogen, methyl or methoxy,
R$^5$ is methyl or ethyl,
R$^3$ and R$^4$ is hydrogen, $C_1$-$C_2$-alkyl, $(CH_2)$-phenyl, $CH_2$—CH=CH$_2$, $(CH_2)_2$—O—$(C_1$-$C_2)$-alkyl, $(CH_2)_2$—O-phenyl, $(CH_2)_2$—O-benzyl, $(CH_2)_2$—O—$(CH_2)_m$—O—$(C_1$-$C_2)$-alkyl, $(CH_2)_2$—O—$(CH_2)_m$—O-phenyl, $(CH_2)_2$—O—$(CH_2)_m$—O-benzyl, $(CH_2)_n$—COO—$(C_1$-$C_2)$-alkyl, $(CH_2)_n$—COO-phenyl, $(CH_2)_n$—COO-benzyl, —$(CH_2)_n$—CN, $(CH_2)_n$—COO$(CH_2)_m$—CO—$(C_1$-$C_2)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1$-$C_2)$-alkyl, $(CH_2)_n$—O—CO-phenyl, $(CH_2)_n$—O—CO-benzyl, COO—$(CH_2)_n$-2-furfuryl, COO—$(CH_2)_n$-2-dehydropyranyl, $(CH_2)_m$—O—$(CH_2)_n$-2-furfuryl, $(CH_2)_m$—O—$(CH_2)_n$-2-dehydropyranyl, CHR$^2$—CH=CH$_2$, CHR$^2$—$(CH_2)_p$—O—$(C_1$-$C_2)$-alkyl, CHR$^2$—$(CH_2)_p$—O-phenyl, CHR$^2$—$(CH_2)_p$—O-benzyl, CHR$^2$—$(CH_2)_p$—O—$(CH_2)_m$—O—$(C_1$-$C_2)$-alkyl, CHR$^2$—$(CH_2)_p$—O—$(CH_2)_m$—O-phenyl, CHR$^2$—$(CH_2)_p$—O—$(CH_2)_m$—O-benzyl, CHR$^2$—$(CH_2)_p$—COO—$(C_1$-$C_2)$-alkyl, CHR$^2$—$(CH_2)_p$—COO-phenyl, CHR$^2$—$(CH_2)_p$—COO-benzyl, CHR$^2$—$(CH_2)_p$—CN, CHR$^2$—$(CH_2)_p$—COO$(CH_2)_m$—CO—$(C_1$-$C_2)$-alkyl, CHR$^2$—$(CH_2)_p$—COO$(CH_2)_m$—CO-phenyl, CHR$^2$—$(CH_2)_p$—COO$(CH_2)_m$—CO-benzyl, CHR$^2$—$(CH_2)_p$—O—CO—$(C_1$-$C_2)$-alkyl, CHR$^2$—$(CH_2)_p$—O—CO-phenyl or CHR$^2$—$(CH_2)_p$—O—CO-benzyl,
n is 1 or 2,
m is 1 or 2 and
p is 0 or 1.

Even more preferred are dyes of the formula (III), wherein independent from each other
X is hydrogen, chloro or bromo,
R$^1$ is hydrogen, methyl or methoxy,
R$^5$ is methyl,
R$^3$ and R$^4$ is hydrogen, $C_1$-$C_2$-alkyl, $(CH_2)$-phenyl, $CH_2$—CH=CH$_2$, $(CH_2)_2$—O—$(C_1$-$C_2)$-alkyl, $(CH_2)_2$—O-phenyl, $(CH_2)_2$—O-benzyl, $(CH_2)_2$—O—$(CH_2)_m$—O—$(C_1$-$C_2)$-alkyl, $(CH_2)_n$—COO—$(C_1$-$C_2)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1$-$C_2)$-alkyl, $(CH_2)_n$—COO$(CH_2)_m$—CO-phenyl, $(CH_2)_n$—O—CO—$(C_1$-$C_2)$-alkyl, $(CH_2)_n$—O—CO-phenyl, COO—$(CH_2)_n$-2-furfuryl, $(CH_2)_m$—O—$(CH_2)_n$-2-furfuryl, CHR$^2$—$(CH_2)_p$—COO—$(C_1$-$C_2)$-alkyl, CHR$^2$—$(CH_2)$—O—$(C_1$-$C_2)$-alkyl, CHR$^2$—$(CH_2)_p$—COO$(CH_2)_p$—CO—$(C_1$-$C_2)$-alkyl, CHR$^2$—$(CH_2)_p$—COO$(CH_2)_m$—CO-phenyl, CHR$^2$—$(CH_2)_p$—O—CO—$(C_1$-$C_2)$-alkyl or CHR$^2$—$(CH_2)$—O—CO-phenyl,
n is 1 or 2,
m is 1 or 2 and
p is 0 or 1.

The present invention also provides a process for the production of dyes of formula (I) and mixtures thereof comprising:
a) diazotization of (IV)

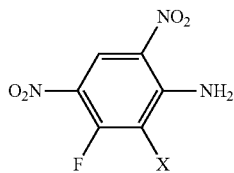

(V)

wherein X is defined as above and
b) coupling the diazonium salt obtained in step a) with compounds of formula (2).

The diazotization of the compound of the formula (IV) and (V), respectively can be performed by means of diazotization methods that are known to a person skilled in the art, preferably by using sodium nitrite or nitrosylsulfuric acid in acidic medium using inorganic acids such as hydrochloric acid, sulfuric acid or phosphoric acid or mixtures thereof or organic acids such as acetic acid or propionic acid or mixtures thereof. Also mixtures of inorganic acid with organic acids can be used advantageously.

The coupling reaction of the diazonium salts obtained by diazotization of the compound of the formula (IV) or (V) onto the compounds of formulae (2) can be performed by known methods.

The compounds of the formula (2) are known and commercially available or can be synthesised by means of common chemical reactions known to a person skilled in the art such as the methods disclosed in chemical encyclopaedia literature like Ullmann's Encylopedia of Industrial Chemistry, Houben-Weyl, other scientific literature and numerous patents.

Through analogy, all the substances that are used in this invention can be synthesized as described.

The dyes of the present invention can be used alone or as a mixture with other dyes according to the present invention and/or other substances.

Thus a chemical composition comprising one or more dye(s) as described above is also an aspect of the present invention.

A chemical composition consisting of two or more dyes as described above forms another preferred aspect of the present invention.

When the dye or a dye mixture of the present invention is used in dyeing, the dye/dye mixture is dispersed in an aqueous medium by means of a dispersing agent and wetting agent in the usual way to prepare a dye bath for dyeing or a printing paste for textile printing.

Thus also an aqueous dispersion for dying comprising a dye or dye mixture as described above forms an aspect of the present invention.

Typical examples of dispersing agent are lignosulphonates, naphthalene sulphonic acid/formaldehyde condensates and phenol/cresol/sulphanilic acid/formaldehyde condensates, typical examples of wetting agent are alkyl aryl ethoxylates, which may be sulphonated or phosphated and typical example of other ingredients, which may be present are inorganic salts, de-dusting agents such as mineral oil or nonanol, organic liquids and buffers. Dispersing agents may be present at from 30 to 500% based on the weight of the dye/dye mixture. Dedusting agents may be used at from 0 to 5% based on the weight of the dye/dye mixture.

The dyes and dye-mixtures of the invention are outstandingly suitable for dyeing and printing hydrophobic materials, the dyeings and prints obtained being notable for level hues and high service fastnesses. Notable features include good wash and contact fastnesses, and also excellent color buildup properties, especially on polyester and polyester-elastane materials.

Accordingly the present invention also provides for the use of the dye and dye mixtures of the invention for dyeing and printing hydrophobic materials, and provides methods of dyeing or printing such materials in conventional procedures, in which a dye mixture of the invention is employed as colorant.

The aforementioned hydrophobic materials may be of synthetic or semisynthetic origin. Suitable materials include, for example, secondary cellulose acetate, cellulose triacetate, polyamides, polylactides, and, in particular, high molecular mass polyesters. Materials made of high molecular mass polyester are more particularly those based on polyethylene terephthalates or polytrimethylene terephthalates. Also contemplated are blend fabrics and blend fibers such as polyester-cotton or polyester-elastane, for example. The hydrophobic synthetic materials may take the form of films or sheet- or threadlike constructions and may have been processed, for example, into yarns or into woven or knitted textile materials. Preference is given to fibrous textile materials, which may also be present in the form of microfibers, for example.

Dyeing in accordance with the use provided by the invention may take place in conventional manner, preferably from aqueous dispersion, optionally in the presence of carriers, at between 80 to about 110° C. by the exhaust process or by the HT process in a dyeing autoclave at 110 to 140° C., and also by the so-called thermofix process, in which the fabric is padded with the dyeing liquor and subsequently fixed at about 180 to 230° C.

Printing of the aforementioned materials may be carried out in a manner known per se by incorporating the dye mixtures of the invention in a print paste and treating the fabric printed therewith to fix the dye, optionally in the presence of a carrier, at temperatures between 180 to 230° C., with HT steam, pressurized steam or dry heat.

Suitable process conditions may be selected from the following:
(i) exhaust dyeing at a pH of from 4 to 8.5, at a temperature of from 125 to 140° C. for from 10 to 120 minutes and under a pressure of from 1 to 2 bar, a sequestrant optionally being added;
(ii) continuous dyeing at a pH of from 4 to 8.5, at a temperature of from 190 to 225° C. for from 15 seconds to 5 minutes, a migration inhibitor optionally being added;
(iii) direct printing at a pH of from 4 to 6.5, at a temperature of from 160 to 185° C. for from 4 to 15 minutes for high temperature steaming, or at a temperature of from 190 to 225° C. for from 15 seconds to 5 minutes for bake fixation with dry heat or at a temperature of from 120 to 140° C. and 1 to 2 bar for from 10 to 45 minutes for pressure steaming, wetting agents and thickeners (such as alginates) of from 5 to 100% by weight of the dye optionally being added;
(iv) discharge printing (by padding the dye on to the textile material, drying and overprinting) at a pH of from 4 to 6.5, migration inhibitors and thickeners optionally being added;
(v) carrier dyeing at a pH of from 4 to 7.5, at a temperature of from 95 to 100° C. using a carrier such as methylnaphthalene, diphenylamine or 2-phenylphenol, sequestrants optionally being added; and
(vi) atmospheric dyeing of acetate, triacetate and nylon at a pH of from 4 to 7.5, at a temperature of about 85° C. for acetate or at a temperature of about 90° C. for triacetate and nylon for from 15 to 90 minutes, sequestrants optionally being added.

For use in dyeing liquors, padding liquors or print pastes, the dye mixtures of the invention are to be in a very fine state of subdivision. Fine subdivision of the dyes is accomplished in a manner known per se by slurrying them together with dispersants in a liquid medium, preferably water, and subjecting the mixture to the action of shearing forces, the dye particles originally present being mechanically comminuted to an extent such that an optimum specific surface area is attained and the sedimentation of the dye is extremely low. This is done in suitable mills, such as ball or sand mills. The particle size of the dyes is generally between 0.1 and 5 µm, preferably about 1 µm.

The dispersants which are used in the milling operation may be nonionic or anionic. Nonionic dispersants are, for example, reaction products of alkylene oxides, such as ethylene oxide or propylene oxide, with alkylatable compounds, such as fatty alcohols, fatty amines, fatty acids, phenols, alcohol phenols, and carboxamides, for example. Anionic dispersants are, for example, lignosulfonates, alkyl- or alkylarylsulfonates or alkylaryl polyglycol ether sulfates.

For the majority of applications the dye preparations obtained in this way are to be pourable. In these cases, therefore, there are limits on the dye content and dispersant content. Generally speaking, the dispersions are adjusted to a dye content of up to 50 percent by weight and a dispersant content of up to about 25 percent by weight. For economic reasons, dye contents are usually not below 15 percent by weight.

The dispersions may also comprise other auxiliaries as well, examples being those which act as oxidizing agents, such as sodium m-nitrobenzenesulfonate, for example, or fungicidal agents, such as sodium o-phenylphenoxide and sodium pentachlorophenoxide, for example, and more particularly what are known as "acid donors", such as butyrolactone, monochloroacetamide, sodium chloroacetate, sodium dichloroacetate, the Na-salt of 3-chloropropionic acid, monoesters of sulfuric acid such as lauryl sulfate, for example, and also sulfuric esters of ethoxylated and propoxylated alcohols, such as butylglycol sulfate, for example.

The dye dispersions obtained in this way can be used with great advantage for making up dyeing liquors and print pastes.

There are certain fields of use where powder formulations are preferred. These powders comprise the dye, dispersants, and other auxiliaries, such as wetting, oxidizing, preserving, and dust proofing agents, for example, and the abovementioned "acid donors".

One preferred method of producing dye preparations in powder form involves stripping the liquid from the liquid dye dispersions described above, by means, for example, of vacuum drying, freeze drying, or by drying on drum dryers, but preferably by spray drying.

The dyeing liquors are produced by diluting the required amounts of the above-described dye formulations with the dyeing medium, preferably with water, to an extent such as to give a liquor ratio of 5:1 to 50:1 for dyeing. Additionally the liquors are generally admixed with further dyeing auxiliaries, such as dispersants, wetting agents, and fixing auxiliaries. Organic and inorganic acids such as acetic acid, succinic acid, boric acid or phosphoric acid are added to set a pH of 4 to 5, preferably 4.5. It is advantageous to buffer the pH which has been set and to add a sufficient amount of a buffer system. One advantageous buffer system, for example, is the acetic acid/sodium acetate system.

Where the dye mixture is to be used in textile printing, the required amounts of the abovementioned dye formulations are kneaded in conventional manner together with thickeners, such as alkali metal alginates or the like, for example, and, optionally, with further adjuvants, such as fixation accelerants, wetting agents, and oxidizing agents, for example, to form print pastes.

The present invention also provides inks for digital textile printing by the ink jet process, which comprise a dye mixture of the invention.

The inks of the invention are preferably aqueous and comprise dye mixtures of the invention in amounts, for example, of 0.1% to 50% by weight, preferably in amounts of 1% to 30% by weight, and more preferably in amounts of 1% to 15% by weight, based on the total weight of the ink. In addition they comprise in particular from 0.1% to 20% by weight of a dispersant. Suitable dispersants are known to a person skilled in the art, are available commercially, and include, for example, sulfonated or sulfomethylated lignins, condensation products of aromatic sulfonic acids and formaldehyde, condensation products of substituted or unsubstituted phenol and formaldehyde, polyacrylates and corresponding copolymers, modified polyurethanes, and reaction products of alkylene oxides with alkylatable compounds, such as fatty alcohols, fatty amines, fatty acids, carboxamides, and unsubstituted or substituted phenols, for example.

The inks of the invention may further comprise the usual additives, examples being viscosity moderators to set viscosities in the range from 1.5 to 40.0 mPas in a temperature range from 20 to 50° C. Preferred inks have a viscosity of 1.5 to 20 mPas, and particularly preferred inks a viscosity of 1.5 to 15 mPas.

Suitable viscosity moderators include rheological additives, such as polyvinylcaprolactam, polyvinylpyrrolidone, and their copolymers, polyether polyol, associative thickeners, polyurea, sodium alginates, modified galactomannans, polyetherurea, polyurethane, and nonionic cellulose ethers, for example.

The inks may further comprise customary adjuvants, such as substances for inhibiting fungal and bacterial growth, for example, in amounts of 0.01% to 1% by weight, based on the total weight of the ink.

An overview of such suitable printing- or formulation aids is given in greater detail e.g. in EP 1 735 385.

In contrast to conventional textile printing, where the printing ink already contains all necessary chemicals, in digital or inkjet printing the auxiliaries have to be applied to the textile substrate in a separate pretreatment step.

The dyestuff may also be applied to textile materials using supercritical carbon dioxide, in which case the dye formulating agents may optionally be omitted.

The synthetic textile material may preferably be selected from aromatic polyester, especially polyethylene terephthalate, polyamide, especially polyhexamethylene adipamide. Also secondary cellulose acetate, cellulose triacetate, and natural textile materials, especially cellulosic materials and wool may be selected. An especially preferred textile material is an aromatic polyester or fibre blend thereof with fibres of any of the mentioned textile materials. Especially preferred fibre blends include those of polyester-cellulose, such as polyester-cotton, and polyester-wool. The textile materials or blends thereof may be in the form of filaments, loose fibres, yarn or woven or knitted fabrics.

Particularly, among polyester fibres, not only ordinary polyester fibres (regular denier fibres) but also microfibers (fine denier fibres, which are less than 0.6 denier) may be used as fibres which can successfully be dyed with the dye mixture of the present invention.

In general all kinds of fibers can be dyed and therefore fiber and blends containing such fiber selected from the group consisting of: synthetic fiber materials, nylon materials, nylon-6, nylon-6.6 and aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers, and Lyocell fibers comprising a dye mixture as described above either in chemically and/or physically bound form forms/form another aspect of the present invention.

The examples below serve to illustrate the invention. Parts and percentages are by weigh unless noted otherwise. The relationship between parts by weight and parts by volume is that of the kilogram to the liter.

EXAMPLES

Intermediate 1:

192 ml (2 Mol) of m 3-Fluor-aniline are added to 200 ml of Toluidine and stirred. To this mixture is heated to 50° C. and 203 ml (2.1 Mol) of Acetanhydride are added while the temperature is kept at 50 to 60° C. After 2 h the mixture is evaporated under vacuum. The remaining product is mixed with 1000 ml of cold water filtrated and dried under vacuum, conditions delivering 292 g of intermediate 1

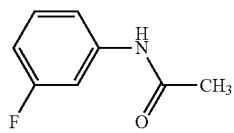

Intermediate 1

Intermediate 2:

137.9 g (0.9 Mol) of Intermediate 1 are added slowly to a mixture of 259 g $HNO_3$ and 630 g of $H_2SO_4$ at −5 to 0° C. The mixture is stirred at 0 to 5° C. for 1 h and then added to a stirred mix of 4 l ice/water, isolated by filtration and dried under vacuum conditions to deliver 140 g of Intermediate 2

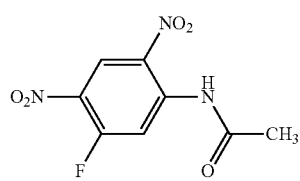

Intermediate 2

Intermediate 3:

140 g of intermediate 2 are added to 545 ml 50% $H_2SO_4$ and heated for 3 h to 100° C. under stirring. The mixture is added to 5 l of ice/water, isolated by filtration and dried under vacuum conditions to deliver 107 g of intermediate 3

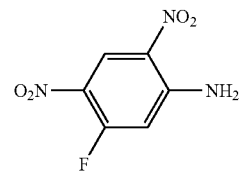

Intermediate 3

An alternative synthesis for intermediate 3 is shown below: (Organic Letters, 14(10), 2504-2507; 2012/Journal of Organic Chemistry, 27, 1910-11; 1962/Bioorganic & Medicinal Chemistry Letters, 21(14), 4189-4192; 2011)

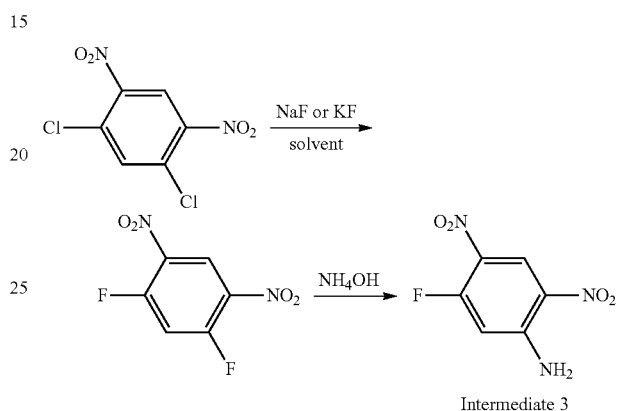

Intermediate 3

Intermediate 4:

38.8 g (0.193 Mol) of Intermediate 3 are dissolved in 200 ml of acetic acid and 40 ml of 37% HCl are added. The mixture is stirred at 25° C. and 21 ml of $H_2O_2$ 35% are added slowly. This mixture is stirred at 25 to 30° C. for 3 days and then poured on 1000 ml of ice/water, isolated by filtration and dried under vacuum conditions to deliver 39.5 g of intermediate 4

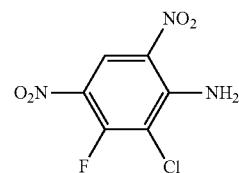

Intermediate 4

Intermediate 5:

38.8 g (0.193 Mol) of Intermediate 3 are dissolved in 200 ml of acetic acid and 11.6 ml Bromine (0.22 Mol) are added slowly at 25° C. This mixture is stirred at for 3 days at 25 to 30° C. and then the poured on 1000 ml of ice/water, isolated by filtration and dried under vacuum conditions to deliver 48.1 g of intermediate 5

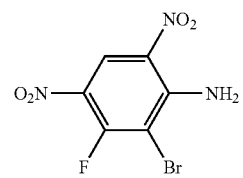

Intermediate 5

Coupling Components (K)/(2) and (2a)

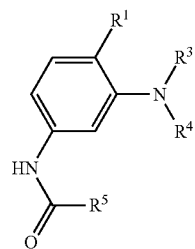

(2a)

for disperse dyes are well known and described in chemical encyclopaedia literature like Ullmann's Encyclopedia of Industrial Chemistry, Houben-Weyl, other scientific literature and numerous patents. Thus detailed synthesis is only given for a few coupling components.

Coupler 1:

80 g of Zn powder are activated by stirring it in 5% aqueous HCl, filtrated and washed with water. 54 g (0.3 Mol) of 3-Amino-4-methoxyacetanilid are stirred in 250 ml of acetic acid and 25 ml of water and 35.2 g (0.3 Mol) of Methyacetoacetat ($CH_3COCH_2COOCH_3$). To this mixture the activated Zn-powder is added at 25° C. The temperature rises after the reaction starts and is kept at 80 to 90° C. for 12 h. The acetic acid is evaporated under vacuum and 300 ml water and 300 ml $CH_2Cl_2$ are added. The pH is adjusted to 7 with Ammonia solution and the 2 phases are mixed intensively, after phase-separation, the organic phase is isolated.

The aqueous phase is extracted with 100 ml of $CH_2Cl_2$ and both organic phases are combined, washed with water, dried with $MgSO_4$ and evaporated under vacuum resulting in 39.2 g of Coupler 1

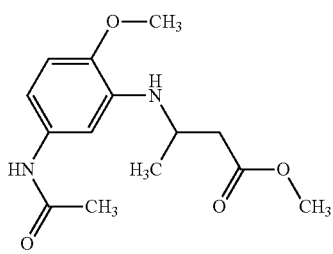

Coupler 1

Dye Example 1

Diazotation:

8.8 g of intermediate 3 are mixed with 85 ml of acetic-/propionic-acid (60/40) and cooled down to 0° C. 8.0 ml of nitrosylsulfuric acid is added slowly at 0° C. This mixture is stirred 4 h at 0° C. and the excess of Nitrite is destroyed the Amidosulfonic acid.

Coupling:

9.4 g of 3-(N,N-diethyl)-aminoacetanilid are mixed with 140 ml of Methanol and 10 g of Sodium acetate and 2 g of urea and cooled down to 5° C. To this mixture the diazotation is added slowly and the reaction mixture is stirred for 30 min at 5° C.

100 ml of water are added and the resulting product is isolated by filtration.

After re-crystallisation from Ethanol and drying under vacuum conditions, 10.6 g of the dye are obtained.

Example 1

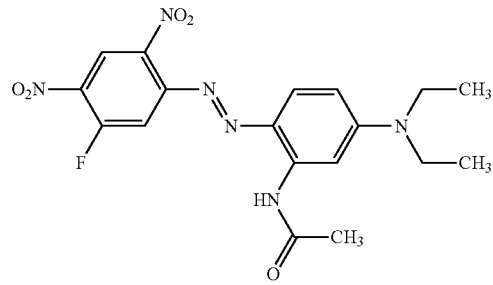

This dye of the invention was further formulated using dispersing agent, glass bead milling and dried via spray drying and gives deep violet dyeing's or prints, on polyester or polyester blends for example, under the dyeing conditions typical for disperse dyes with very good fastness properties.

Example 2

Diazotation:

8.8 g of intermediate 5 are mixed with 85 ml of acetic-/propionic-acid (60/40) and cooled down to 0° C. 8.0 ml of nitrosylsulfuric acid is added slowly at 0° C. This mixture is stirred 4 h at 0° C. and the excess of Nitrite is destroyed the Amidosulfonic acid.

Coupling:

11.04 g of 3-(N,N-dipropyl)mesylmetamin (N-(3-Dipropylamino-phenyl)metanesulfonamid) are mixed with 140 ml of Methanol and 10 g of Sodium acetate and 2 g of urea and cooled down to 5° C. To this mixture the diazotation is added slowly and the reaction mixture is stirred for 30 min at 5° C.

100 ml of water are added and the resulting product is isolated by filtration.

After re-crystallisation from Acetone and drying under vacuum conditions, 10.6 g of the Example 2-dye are obtained.

Example 2

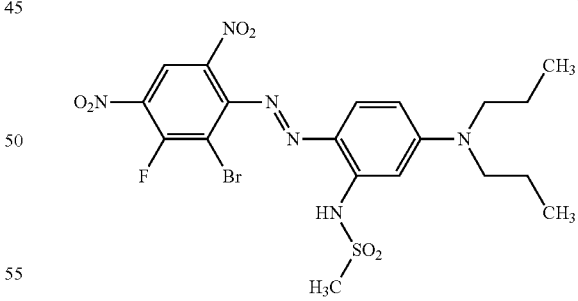

The resulting dye of the invention was formulated using dispersing agent, glass bead milling and dried via spray drying and gives deep violet dyeing's or prints on polyester or polyester blends for example, under the dyeing conditions typical for disperse dyes with very good fastness properties.

Examples 3 to 5

With the following annelated/substituted couplers (Coupler 2 to 4) and the diazo-component Intermediate 3 or Intermediate 5 also high wash fast dyes can be prepared following the procedure of Example 1.

Coupler 2

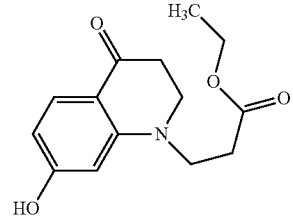

Coupler 3

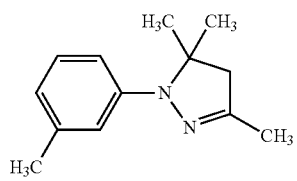

Coupler 4

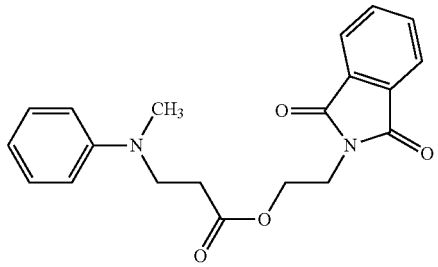

Example 3

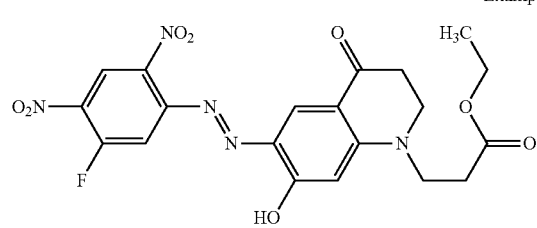

that dyes polyester in deep red shades,

Example 4

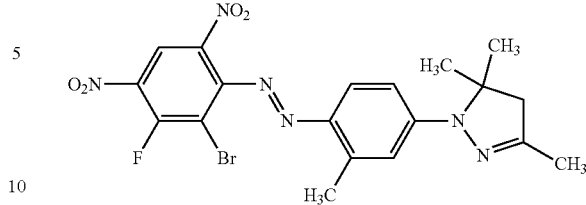

that dyes polyester in deep reddish blue shades,

Example 5

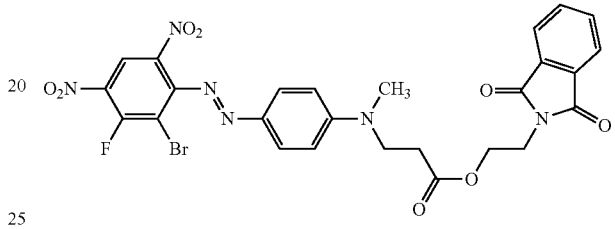

that dyes polyester in deep bluish-red shades.

Examples 6 to 63 of Formula (IIa)

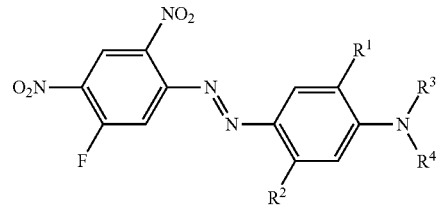

(IIa)

can be prepared according the procedure of example 1 or 2 using Intermediate 3 as a diazo-component and coupling components of formula (2) with:

| No: | $R^1$ | $R^2$ | $R^3$ | $R^4$ | Shade on polyester |
|---|---|---|---|---|---|
| 6 | Hydrogen | $CH_3$ | $(CH_2)_2$—O—$CH_3$ | $(CH_2)_2$—O—$CH_3$ | Red-violet |
| 7 | Hydrogen | $CH_3$ | $(CH_2)_2$—COO—$CH_3$ | Hydrogen | Red-violet |
| 8 | Hydrogen | $CH_3$ | $C_2H_4$ | $(CH_2)_2$—COO—$CH_3$ | Red-violet |
| 9 | Hydrogen | Hydrogen | $C_2H_4$ | $CH_2$—COO—$CH_3$ | Red-violet |
| 10 | Hydrogen | Hydrogen | $(CH_2)_2$—COO—$CH_3$ | $(CH_2)_2$—COO—$CH_3$ | Bluish red |
| 11 | Hydrogen | Hydrogen | $(CH_2)_2$—COO—$CH_3$ | $C_2H_4$ | Red-violet |
| 12 | Hydrogen | Hydrogen | $CH_2$-phenyl | $CH_2$—CH=$CH_2$ | Red-violet |
| 13 | Hydrogen | Hydrogen | $CH_2$—CH=$CH_2$ | $CH_2$—CH=$CH_2$ | Red-violet |
| 14 | Hydrogen | COO$(CH_2)_2$—O—$CH_3$ | $C_2H_5$ | $C_2H_5$ | Bluish red |
| 15 | Hydrogen | COO$(CH_2)_2$—O—$CH_3$ | Hydrogen | $CH_2$-phenyl | Bluish red |
| 16 | Hydrogen | Hydrogen | $(CH_2)_2$—O—$CH_3$ | $(CH_2)_2$—O—$CH_3$ | Red-violet |
| 17 | Hydrogen | Hydrogen | Hydrogen | $(CH_2)_2$—O—$C_2H_5$ | Bluish red |
| 18 | Hydrogen | Hydrogen | $(CH_2)_2$—O-phenyl | $(CH_2)_2$—O-phenyl | Red-violet |
| 19 | Hydrogen | Hydrogen | $(CH_2)_2$—O-benzyl | $CH_3$ | Red-violet |
| 20 | Hydrogen | Hydrogen | $CH_2$-phenyl | $CH_2$—COO—$CH_3$ | Red-violet |
| 21 | Hydrogen | Cl | Hydrogen | $(CH_2)_2$—O—$CH_3$ | Red |
| 22 | Hydrogen | Cl | $CH_2$—COO—$C_2H_5$ | $CH_2$—COO—$C_2H_5$ | Red-violet |
| 23 | Hydrogen | Cl | $(CH_2)_2$—O—$CH_3$ | $(CH_2)_2$—O—$CH_3$ | Bluish red |
| 24 | Hydrogen | Hydrogen | $(CH_2)_2$—COO—$CH_3$ | $CH_2$-phenyl | Red-violet |
| 25 | Hydrogen | Hydrogen | $(CH_2)_2$—COO—$CH_3$ | Hydrogen | Bluish red |
| 26 | Hydrogen | Hydrogen | $(CH_2)_2$—COO-phenyl | Hydrogen | Bluish red |
| 27 | Hydrogen | Hydrogen | $CH_3$ | $(CH_2)_2$—COO-benzyl | Red-violet |

-continued

| No: | R¹ | R² | R³ | R⁴ | Shade on polyester |
|---|---|---|---|---|---|
| 28 | Hydrogen | Hydrogen | (CH₂)₂—CN | (CH₂)₂—COO-benzyl | Red-violet |
| 29 | Hydrogen | Hydrogen | (CH₂)₂—CN | (CH₂)₂—CN | Bluish red |
| 30 | Hydrogen | Hydrogen | (CH₂)₂—COO—CH₂—CO—CH₃ | CH₂-phenyl | Red-violet |
| 31 | Hydrogen | Hydrogen | Hydrogen | (CH₂)₂—COO—CH₂—CO—CH₃ | Bluish red |
| 32 | Hydrogen | Hydrogen | (CH₂)₂—COO—CH₂—CO-phenyl | C₂H₅ | Red-violet |
| 33 | Hydrogen | COOH | CH₂—CH=CH₂ | CH₂—CH=CH₂ | Bluish red |
| 34 | Hydrogen | COOH | CH₃ | CH₃ | Bluish red |
| 35 | Hydrogen | COOH | C₂H₅ | (CH₂)₂—OCO-phenyl | Bluish red |
| 36 | Hydrogen | Hydrogen | (CH₂)₂—OCO-phenyl | C₂H₄ | Red-violet |
| 37 | Hydrogen | Hydrogen | (CH₂)₂—O—CH₂-(2-furfuryl) | C₂H₄ | Red-violet |
| 38 | Hydrogen | Hydrogen | (CH₂)₂—COO—CH₃ | (CH₂)₂—COO—CH₂-(2-furfuryl) | Red-violet |
| 39 | Hydrogen | Hydrogen | Hydrogen | CH(CH₃)—CH₂—COO—CH₃ | Bluish red |
| 40 | Hydrogen | Hydrogen | CH(CH₃)—CH₂—COO—CH₂—CO—CH₃ | CH₂-phenyl | Red-violet |
| 41 | Hydrogen | Hydrogen | Hydrogen | CH(CH₃)—CH₂—COO—CH₂—CO-phenyl | Bluish red |
| 42 | Hydrogen | Hydrogen | CH(CH₃)—CH₂—OCO—CH₃ | Hydrogen | Bluish red |
| 43 | Hydrogen | Hydrogen | Hydrogen | CH(CH₃)—CH₂—OCO-phenyl | Bluish red |
| 44 | Hydrogen | Hydrogen | C₂H₄ | CH₂-phenyl | Red-violet |
| 45 | Hydrogen | Hydrogen | Hydrogen | CH₂-phenyl | Violet |
| 46 | Hydrogen | Hydrogen | C₂H₄ | C₂H₄ | Red-violet |
| 47 | Hydrogen | CH₃ | CH₂—COO—C₂H₅ | CH₂—COO—C₂H₅ | Red-violet |
| 48 | Hydrogen | CH₃ | CH₂—COO—CH₃ | Hydrogen | Red-violet |
| 49 | Hydrogen | CH₃ | C₂H₄ | (CH₂)₂—OCO—CH₃ | Red-violet |
| 50 | Hydrogen | CH₃ | (CH₂)₂—COO—CH₂—CO—CH₃ | C₂H₅ | Red-violet |
| 51 | Hydrogen | CH₃ | Hydrogen | CH₂-phenyl | Red-violet |
| 52 | Hydrogen | CH₃ | CH₂-phenyl | (CH₂)₂—COO—CH₂—CO—CH₃ | Red-violet |
| 53 | Hydrogen | CH₃ | CH(CH₃)—CH₂—OCO—CH₃ | Hydrogen | Red-violet |
| 54 | Hydrogen | Hydrogen | (CH₂)₂—OCO—CH₃ | (CH₂)₂—OCO—CH₃ | Red-violet |
| 55 | Hydrogen | Hydrogen | (CH₂)₂—OCO—CH₃ | C₂H₄ | Red-violet |
| 56 | Hydrogen | Hydrogen | Hydrogen | (CH₂)₂—OCO—CH₃ | Bluish red |
| 57 | Hydrogen | COOCH₃ | (CH₂)₂—O—CH₃ | (CH₂)₂—O—CH₃ | Bluish red |
| 58 | Hydrogen | COOCH₃ | (CH₂)₂—COO—CH₃ | Hydrogen | Bluish red |
| 60 | Hydrogen | COOCH₃ | CH₂-phenyl | C₂H₅ | Bluish red |
| 61 | Hydrogen | OH | C₂H₅ | C₂H₅ | Violet |
| 62 | Hydrogen | OH | CH₂-phenyl | C₂H₅ | Violet |
| 63 | Hydrogen | OH | (CH₂)₂—O—C₂H₅ | (CH₂)₂—O—C₂H₅ | Violet |

Examples 64 to 95 of Formula (IIb)

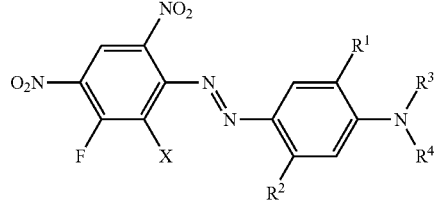

can be prepared according the procedure of example 1 or 2 using Intermediate 4 or intermediate 5 as a diazo-component and coupling components of formula (2) with:

| No: | X | R¹ | R² | R³ | R⁴ | Shade on polyester |
|---|---|---|---|---|---|---|
| 64 | Cl | Hydrogen | Hydrogen | CH₃ | CH₃ | Violet |
| 65 | Br | Hydrogen | Hydrogen | CH₂—CH=CH₂ | CH₂—CH=CH₂ | Violet |
| 66 | Br | Hydrogen | Hydrogen | (CH₂)₂—O—C₂H₅ | (CH₂)₂—O—C₂H₅ | Violet |
| 67 | Br | Hydrogen | Hydrogen | CH₂—COO—CH₃ | Hydrogen | Red-violet |
| 68 | Br | Hydrogen | Hydrogen | CH₂—COO—C₂H₅ | CH₂-phenyl | Red-violet |
| 69 | Br | Hydrogen | Hydrogen | C₄H₉ | CH₂—COO—C₂H₅ | Red-violet |
| 70 | Br | Hydrogen | Hydrogen | (CH₂)₂—COO—C₂H₅ | (CH₂)₂—COO—C₂H₅ | Red-violet |
| 71 | Br | Hydrogen | Hydrogen | C₂H₄ | (CH₂)₂—COO—CH₃ | Violet |
| 72 | Cl | Hydrogen | Hydrogen | (CH₂)₂—COO—CH₃ | CH₂-phenyl | Violet |
| 73 | Cl | Hydrogen | Hydrogen | (CH₂)₂—COO—CH₃ | Hydrogen | Red-violet |
| 74 | Br | Hydrogen | Hydrogen | Hydrogen | (CH₂)₂—COO-phenyl | Red-violet |
| 75 | Br | Hydrogen | Hydrogen | (CH₂)₂—CN | (CH₂)₂—CN | Red-violet |

-continued

| No: | X | $R^1$ | $R^2$ | $R^3$ | $R^4$ | Shade on polyester |
|---|---|---|---|---|---|---|
| 76 | Br | Hydrogen | Hydrogen | $(CH_2)_2$—COO—$CH_2$—CO—$CH_3$ | $C_2H_5$ | Violet |
| 78 | Cl | Hydrogen | Hydrogen | $CH_2$—phenyl | $(CH_2)$—COO—$CH_2$—CO—$CH_3$ | Red-violet |
| 79 | Cl | Hydrogen | Hydrogen | Hydrogen | $(CH_2)_2$—COO—$CH_2$—CO—$CH_3$ | Red-violet |
| 80 | Br | Hydrogen | Hydrogen | $(CH_2)_2$—OCO—$CH_3$ | $(CH_2)_2$—OCO—$CH_3$ | Red-violet |
| 81 | Br | Hydrogen | Hydrogen | $C_2H_4$ | $(CH_2)_2$—OCO—$CH_3$ | Violet |
| 82 | Cl | Hydrogen | Hydrogen | $(CH_2)_2$—OCO—$CH_3$ | $CH_2$-phenyl | Violet |
| 83 | Cl | Hydrogen | Hydrogen | $(CH_2)_2$—OCO—$CH_3$ | Hydrogen | Red-violet |
| 84 | Cl | Hydrogen | $CH_3$ | $(CH_2)_2$—O—$CH_3$ | $(CH_2)_2$—O—$CH_3$ | Violet |
| 85 | Br | Hydrogen | $CH_3$ | Hydrogen | $(CH_2)_2$—COO—$CH_3$ | Red-violet |
| 86 | Br | Hydrogen | $CH_3$ | $(CH_2)_2$—COO—$C_2H_5$ | $(CH_2)_2$—COO—$C_2H_5$ | Red-violet |
| 87 | Br | Hydrogen | $CH_3$ | $C_2H_4$ | $(CH_2)_2$—COO—$CH_3$ | Violet |
| 88 | Br | Hydrogen | $CH_3$ | $(CH_2)_2$—COO—$CH_3$ | $CH_2$-phenyl | Violet |
| 89 | Br | Hydrogen | $CH_3$ | $(CH_2)_2$—COO—$CH_2$—CO—$CH_3$ | $C_2H_5$ | Red-violet |
| 90 | Br | Hydrogen | $CH_3$ | $(CH_2)_2$—COO—$CH_2$—CO—$CH_3$ | $CH_2$-phenyl | Violet |
| 91 | Br | Hydrogen | $CH_3$ | $CH(CH_3)$—$CH_2$—OCO—$C_2H_5$ | Hydrogen | Red-violet |
| 92 | Br | Hydrogen | Cl | $CH_2$—COO—$CH_3$ | $CH_2$—COO—$CH_3$ | Red-violet |
| 93 | Cl | Hydrogen | $COOCH_3$ | $(CH_2)_2$—COO—$C_2H_5$ | Hydrogen | Red-violet |
| 94 | Cl | Hydrogen | COOH | $C_3H_7$ | $C_3H_7$ | Red-violet |
| 95 | Cl | Hydrogen | OH | $(CH_2)_2$—O—$C_2H_5$ | $(CH_2)_2$—O—$C_2H_5$ | Red-violet |

Examples 96 to 202 of Formula (IIc)

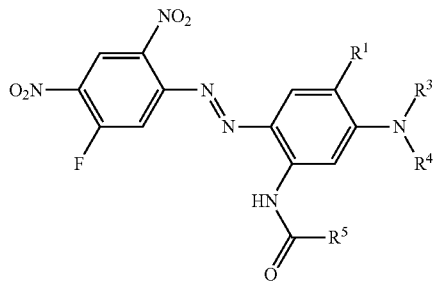

(IIc)

i. e. structures, wherein $R^2$ of general structure (II) is NHCO—$R^5$, and wherein the $R^5$ is alkyl, i. e. $R^2$ of (II) is NHCO—$(C_1$-$C_2)$-alkyl and which can be prepared according the procedure of example 1 or 2 using Intermediate 3 as a diazo-component and coupling components of formula (2a) with:

| No: | $R^1$ | $R^3$ | $R^4$ | $R^5$ | Shade on polyester |
|---|---|---|---|---|---|
| 96 | Hydrogen | $(CH_2)_2$—O—$(CH_2)_3$—O—$CH_3$ | $(CH_2)_2$—O—$(CH_2)_3$—O—$CH_3$ | Methyl | Violet |
| 97 | Hydrogen | $CH_2$—COO—$CH_3$ | $CH_2$—COO—$CH_3$ | Methyl | Violet |
| 98 | Hydrogen | $CH_2$-phenyl | $CH_2$—COO—$CH_3$ | Methyl | Violet |
| 99 | Hydrogen | $C_2H_4$ | $CH_2$—COO—$CH_3$ | Methyl | Violet |
| 100 | Hydrogen | $(CH_2)_2$—COO—$CH_3$ | $(CH_2)_2$—COO—$CH_3$ | Methyl | Violet |
| 101 | Hydrogen | $(CH_2)_2$—O—$CH_3$ | $(CH_2)_2$—O—$CH_3$ | Methyl | Violet |
| 102 | Hydrogen | Hydrogen | $(CH_2)_2$—O—$C_2H_5$ | Ethyl | Violet |
| 103 | Hydrogen | $(CH_2)_2$—O-phenyl | $(CH_2)_2$—O-phenyl | Methyl | Violet |
| 104 | Hydrogen | $C_2H_4$ | $(CH_2)_2$—O-phenyl | Methyl | Violet |
| 105 | Hydrogen | $(CH_2)_2$—O-benzyl | Hydrogen | Methyl | Violet |
| 106 | Hydrogen | $CH(CH_3)$—$CH_2$—COO—$CH_2$—CO—$CH_3$ | Hydrogen | Methyl | Violet |
| 107 | Hydrogen | Hydrogen | $CH(CH_3)$—$CH_2$—COO—$CH_2$—CO-phenyl | Methyl | Violet |
| 108 | Hydrogen | $CH(CH_3)$—$CH_2$—OCO—$CH_3$ | Hydrogen | Methyl | Violet |
| 109 | Hydrogen | $CH(CH_3)$—$CH_2$—OCO—$C_2H_5$ | $C_2H_4$ | Ethyl | Violet |
| 110 | Hydrogen | Hydrogen | $CH(CH_3)$—$CH_2$—OCO-phenyl | Methyl | Violet |
| 111 | Hydrogen | $(CH_2)_2$—COO—$CH_3$ | $C_2H_4$ | Methyl | Violet |
| 112 | Hydrogen | $(CH_2)_2$—COO—$CH_3$ | $CH_2$-phenyl | Methyl | Violet |
| 113 | Hydrogen | $(CH_2)_2$—COO—$CH_3$ | Hydrogen | Methyl | Violet |
| 114 | Hydrogen | $(CH_2)_2$—COO-phenyl | Hydrogen | Ethyl | Violet |
| 115 | Hydrogen | Hydrogen | $CH_2)_2$—COO-benzyl | Methyl | Violet |
| 116 | Hydrogen | $(CH_2)_2$—O—$CH_2$-(2-furfuryl) | $C_2H_4$ | Methyl | Violet |
| 117 | Hydrogen | $CH_2$—COO—$CH_2$-(2-furfuryl) | $CH_2$—COO—$C_2H_5$ | Ethyl | Violet |
| 118 | Hydrogen | $(CH_2)_2$—COO—$CH_3$ | $(CH_2)_2$—COO—$CH_2$-(2-furfuryl) | Methyl | Violet |
| 119 | Hydrogen | Hydrogen | $CH(CH_3)$—$CH_2$—COO—$CH_3$ | Methyl | Violet |
| 120 | Hydrogen | $CH(CH_3)$—$CH_2$—O—$CH_3$ | Hydrogen | Methyl | Violet |
| 121 | Hydrogen | Hydrogen | $(CH_2)_2$—COO—$CH_2$—CO-phenyl | Methyl | Violet |
| 122 | Hydrogen | $(CH_2)_2$—OCO—$CH_3$ | $(CH_2)_2$—OCO—$CH_3$ | Methyl | Violet |
| 123 | Hydrogen | $(CH_2)_2$—OCO—$CH_3$ | $CH_2$-phenyl | Methyl | Violet |
| 124 | Hydrogen | Hydrogen | $(CH_2)_2$—OCO—$CH_3$ | Methyl | Violet |
| 125 | Hydrogen | $(CH_2)_2$—OCO-phenyl | Hydrogen | Ethyl | Violet |
| 126 | Hydrogen | $(CH_2)_2$—OCO-phenyl | $C_2H_4$ | Methyl | Violet |
| 127 | Hydrogen | $(CH_2)_2$—CN | $(CH_2)_2$—CN | Methyl | Violet |

-continued

| No: | R¹ | R³ | R⁴ | R⁵ | Shade on polyester |
|---|---|---|---|---|---|
| 128 | Hydrogen | Hydrogen | (CH$_2$)$_2$—CN | Ethyl | Violet |
| 129 | Hydrogen | (CH$_2$)$_2$—COO—CH$_2$—CO—CH$_3$ | C$_2$H$_5$ | Methyl | Violet |
| 130 | Hydrogen | (CH$_2$)$_2$—COO—CH$_2$—CO—CH$_3$ | CH$_2$-phenyl | Methyl | Violet |
| 131 | Hydrogen | Hydrogen | (CH$_2$)$_2$—COO—CH$_2$—CO—CH$_3$ | Methyl | Violet |
| 132 | Hydrogen | C$_2$H$_4$ | CH$_2$-phenyl | Methyl | Violet |
| 133 | Hydrogen | Hydrogen | CH$_2$-phenyl | Methyl | Violet |
| 134 | Hydrogen | Hydrogen | CH$_3$ | Ethyl | Violet |
| 135 | Hydrogen | C$_3$H$_7$ | C$_3$H$_7$ | Ethyl | Violet |
| 136 | Hydrogen | CH$_2$—CH=CH$_2$ | CH$_2$—CH=CH$_2$ | Methyl | Violet |
| 137 | Methoxy | C$_2$H$_4$ | CH$_2$-phenyl | Methyl | Blue |
| 138 | Methoxy | Hydrogen | CH$_2$-phenyl | Ethyl | Blue |
| 139 | Methoxy | Hydrogen | CH$_3$ | Methyl | Blue |
| 140 | Methoxy | C$_2$H$_4$ | C$_2$H$_4$ | Methyl | Blue |
| 141 | Ethoxy | CH$_2$-phenyl | CH$_2$—CH=CH$_2$ | Methyl | Blue |
| 142 | Methoxy | CH$_2$—CH=CH$_2$ | CH$_2$—CH=CH$_2$ | Methyl | Blue |
| 143 | Methoxy | (CH$_2$)$_2$—O—CH$_3$ | (CH$_2$)$_2$—O—CH$_3$ | Methyl | Blue |
| 144 | Methoxy | (CH$_2$)$_2$—O—C$_2$H$_5$ | (CH$_2$)$_2$—O—C$_2$H$_5$ | Ethyl | Blue |
| 145 | Ethoxy | Hydrogen | (CH$_2$)$_2$—O—C$_2$H$_5$ | Methyl | Blue |
| 146 | Methoxy | (CH$_2$)$_2$—O-phenyl | (CH$_2$)$_2$—O-phenyl | Methyl | Blue |
| 147 | Methoxy | C$_2$H$_4$ | (CH$_2$)$_2$—O-phenyl | Methyl | Blue |
| 148 | Methoxy | Hydrogen | (CH$_2$)$_2$—O-phenyl | Ethyl | Blue |
| 149 | Methoxy | (CH$_2$)$_2$—O-benzyl | (CH$_2$)$_2$—O-benzyl | Methyl | Blue |
| 150 | Ethoxy | (CH$_2$)$_2$—O-benzyl | CH$_3$ | Ethyl | Blue |
| 151 | Methoxy | (CH$_2$)$_2$—O-benzyl | Hydrogen | Methyl | Blue |
| 152 | Methoxy | (CH$_2$)$_2$—O—(CH$_2$)$_3$—O—CH$_3$ | (CH$_2$)$_2$—O—(CH$_2$)$_3$—O—CH$_3$ | Methyl | Blue |
| 153 | Ethoxy | (CH$_2$)$_2$—O—(CH$_2$)$_3$—O—C$_2$H$_5$ | (CH$_2$)$_2$—O—(CH$_2$)$_3$—O—C$_2$H$_5$ | Methyl | Blue |
| 154 | Methoxy | CH$_2$—COO—CH$_3$ | CH$_2$—COO—CH$_3$ | Methyl | Blue |
| 155 | Methoxy | CH$_2$-phenyl | CH$_2$—COO—CH$_3$ | Ethyl | Blue |
| 156 | Methoxy | C$_2$H$_4$ | CH$_2$—COO—CH$_3$ | Methyl | Blue |
| 157 | Methoxy | CH$_2$—COO—C$_2$H$_5$ | CH$_2$—COO—C$_2$H$_5$ | Methyl | Blue |
| 158 | Methoxy | (CH$_2$)$_2$—COO—CH$_3$ | (CH$_2$)$_2$—COO—CH$_3$ | Methyl | Blue |
| 159 | Ethoxy | (CH$_2$)$_2$—COO—C$_2$H$_5$ | (CH$_2$)$_2$—COO—C$_2$H$_5$ | Methyl | Blue |
| 160 | Methoxy | (CH$_2$)$_2$—COO—CH$_3$ | C$_2$H$_4$ | Methyl | Blue |
| 161 | Methoxy | (CH$_2$)$_2$—COO—CH$_3$ | CH$_2$-phenyl | Methyl | Blue |
| 162 | Ethoxy | CH$_3$ | (CH$_2$)$_2$—COO—C$_2$H$_5$ | Methyl | Blue |
| 163 | Methoxy | Hydrogen | (CH$_2$)$_2$—COO—CH$_3$ | Methyl | Blue |
| 164 | Methoxy | (CH$_2$)$_2$—COO-phenyl | Hydrogen | Ethyl | Blue |
| 165 | Methoxy | (CH$_2$)$_2$—COO-phenyl | C$_2$H$_4$ | Methyl | Blue |
| 166 | Ethoxy | (CH$_2$)$_2$—COO-phenyl | (CH$_2$)$_2$—O—CH$_3$ | Methyl | Blue |
| 167 | Methoxy | (CH$_2$)$_2$—COO-phenyl | CH$_2$-phenyl | Methyl | Blue |
| 168 | Methoxy | Hydrogen | (CH$_2$)$_2$—COO-benzyl | Methyl | Blue |
| 169 | Methoxy | CH$_3$ | (CH$_2$)$_2$—COO-benzyl | Ethyl | Blue |
| 170 | Methoxy | (CH$_2$)$_2$—CN | (CH$_2$)$_2$—COO-benzyl | Methyl | Blue |
| 171 | Methoxy | (CH$_2$)$_2$—CN | (CH$_2$)$_2$—CN | Methyl | Blue |
| 172 | Methoxy | Hydrogen | (CH$_2$)$_2$—CN | Ethyl | Blue |
| 173 | Methoxy | (CH$_2$)$_2$—COO—CH$_2$—CO—CH$_3$ | C$_2$H$_5$ | Methyl | Blue |
| 174 | Methoxy | (CH$_2$)$_2$—COO—CH$_2$—CO—CH$_3$ | CH$_2$-phenyl | Methyl | Blue |
| 175 | Methoxy | Hydrogen | (CH$_2$)$_2$—COO—CH$_2$—CO—CH$_3$ | Methyl | Blue |
| 176 | Methoxy | (CH$_2$)$_2$—COO—CH$_2$—CO—C$_2$H$_5$ | CH$_3$ | Methyl | Blue |
| 177 | Methoxy | (CH$_2$)$_2$—COO—CH$_2$—CO-phenyl | C$_2$H$_5$ | Methyl | Blue |
| 178 | Methoxy | Hydrogen | (CH$_2$)$_2$—COO—CH$_2$—CO-phenyl | Methyl | Blue |
| 179 | Ethoxy | (CH$_2$)$_2$—COO—CH$_2$—CO-benzyl | C$_2$H$_5$ | Methyl | Blue |
| 180 | Methoxy | Hydrogen | (CH$_2$)$_2$—COO—CH$_2$—CO-benzyl | Methyl | Blue |
| 181 | Methoxy | (CH$_2$)$_2$—OCO—CH$_3$ | (CH$_2$)$_2$—OCO—CH$_3$ | Methyl | Blue |
| 182 | Methoxy | (CH$_2$)$_2$—OCO—C$_2$H$_5$ | (CH$_2$)$_2$—OCO—C$_2$H$_5$ | Methyl | Blue |
| 183 | Methoxy | (CH$_2$)$_2$—OCO—CH$_3$ | C$_2$H$_4$ | Methyl | Blue |
| 184 | Methoxy | (CH$_2$)$_2$—OCO—CH$_3$ | CH$_2$-phenyl | Methyl | Blue |
| 185 | Ethoxy | Hydrogen | (CH$_2$)$_2$—OCO—CH$_3$ | Ethyl | Blue |
| 186 | Methoxy | (CH$_2$)$_2$—OCO-phenyl | Hydrogen | Methyl | Blue |
| 187 | Methoxy | (CH$_2$)$_2$—OCO-phenyl | C$_2$H$_4$ | Methyl | Blue |
| 188 | Methoxy | (CH$_2$)$_2$—OCO-phenyl | (CH$_2$)$_2$—O—CH$_3$ | Methyl | Blue |
| 189 | Methoxy | (CH$_2$)$_2$—O—CH$_2$-(2-furfuryl) | CH$_2$-phenyl | Methyl | Blue |
| 190 | Methoxy | (CH$_2$)$_2$—O—CH$_2$-(2-furfuryl) | C$_2$H$_4$ | Methyl | Blue |
| 191 | Methoxy | (CH$_2$)$_2$—O—CH$_2$-(2-furfuryl) | (CH$_2$)$_2$—COO—C$_2$H$_5$ | Methyl | Blue |
| 192 | Methoxy | CH$_2$—COO—CH$_2$-(2-furfuryl) | CH$_2$—COO—C$_2$H$_5$ | Methyl | Blue |
| 193 | Methoxy | (CH$_2$)$_2$—COO—CH$_3$ | (CH$_2$)$_2$—COO—CH$_2$-(2-furfuryl) | Methyl | Blue |
| 194 | Methoxy | Hydrogen | CH(CH$_3$)—CH$_2$—COO—CH$_3$ | Methyl | Blue |
| 195 | Methoxy | CH(CH$_3$)—CH$_2$—O—CH$_3$ | Hydrogen | Methyl | Blue |
| 196 | Methoxy | Hydrogen | CH(CH$_3$)—CH$_2$—O—C$_2$H$_5$ | Methyl | Blue |
| 197 | Methoxy | CH(CH$_3$)—CH$_2$—COO—CH$_2$—CO—CH$_3$ | Hydrogen | Methyl | Blue |
| 198 | Methoxy | CH(CH$_3$)—CH$_2$—COO—CH$_2$—CO—CH$_3$ | CH$_2$-phenyl | Ethyl | Blue |
| 199 | Methoxy | Hydrogen | CH(CH$_3$)—CH$_2$—COO—CH$_2$—CO-phenyl | Methyl | Blue |
| 200 | Methoxy | CH(CH$_3$)—CH$_2$—OCO—CH$_3$ | Hydrogen | Methyl | Blue |
| 201 | Methoxy | CH(CH$_3$)—CH$_2$—OCO—C$_2$H$_5$ | C$_2$H$_4$ | Methyl | Blue |
| 202 | Methoxy | Hydrogen | CH(CH$_3$)—CH$_2$—OCO-phenyl | Methyl | Blue |

Examples 203 to 312 of Formula (III)

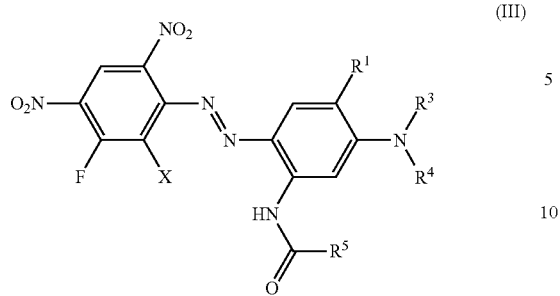

can be prepared according the procedure of example 1 or 2 using Intermediate 4 or Intermediate 5 as a diazo-component and coupling components of formula (2a) with:

| No: | X | $R^1$ | $R^3$ | $R^4$ | $R^5$ | Shade on polyester |
|---|---|---|---|---|---|---|
| 203 | Bromo | Hydrogen | $(CH_2)_2$—O—$(CH_2)_3$—O—$CH_3$ | $(CH_2)_2$—O—$(CH_2)_3$—O—$CH_3$ | Methyl | Blue |
| 204 | Chloro | Hydrogen | $CH_2$—COO—$CH_3$ | $CH_2$—COO—$CH_3$ | Methyl | Reddish blue |
| 205 | Bromo | Hydrogen | $C_2H_4$ | $CH(CH_3)$—COO—$C_2H_5$ | Methyl | Blue |
| 206 | Bromo | Hydrogen | $CH(CH_3)$—COO—$CH_3$ | $CH_2$—COO—$CH_3$ | Methyl | Reddish blue |
| 207 | Bromo | Hydrogen | $(CH_2)_2$—COO—$CH_3$ | $(CH_2)_2$—COO—$CH_3$ | Methyl | Reddish blue |
| 208 | Bromo | Hydrogen | $(CH_2)_2$—O—$CH_3$ | $(CH_2)_2$—O—$CH_3$ | Methyl | Blue |
| 209 | Chloro | Hydrogen | Hydrogen | $(CH_2)_2$—O—$C_2H_5$ | Ethyl | Blue |
| 210 | Chloro | Hydrogen | $(CH_2)_2$—O-phenyl | $(CH_2)_2$—O-phenyl | Methyl | Reddish blue |
| 211 | Bromo | Hydrogen | $C_2H_4$ | $(CH_2)_2$—O-phenyl | Methyl | Blue |
| 212 | Bromo | Hydrogen | $(CH_2)_2$—O-benzyl | Hydrogen | Methyl | Reddish blue |
| 213 | Bromo | Hydrogen | $CH(CH_3)$—$CH_2$—COO—$CH_2$—CO—$CH_3$ | Hydrogen | Methyl | Reddish blue |
| 214 | Chloro | Hydrogen | Hydrogen | $CH(CH_3)$—$CH_2$—COO—$CH_2$—CO-phenyl | Methyl | Reddish blue |
| 215 | Bromo | Hydrogen | $CH(CH_3)$—$CH_2$—OCO—$CH_3$ | Hydrogen | Methyl | Reddish blue |
| 216 | Bromo | Hydrogen | $CH(CH_3)$—$CH_2$—OCO—$C_2H_5$ | $C_2H_4$ | Ethyl | Blue |
| 217 | Bromo | Hydrogen | Hydrogen | $CH(CH_3)$—$CH_2$—OCO-phenyl | Methyl | Reddish blue |
| 218 | Bromo | Hydrogen | $(CH_2)_2$—COO—$CH_3$ | $C_2H_4$ | Methyl | Blue |
| 219 | Bromo | Hydrogen | $(CH_2)_2$—COO—$CH_3$ | $CH_2$-phenyl | Methyl | Blue |
| 220 | Bromo | Hydrogen | $(CH_2)_2$—COO—$CH_3$ | Hydrogen | Methyl | Reddish blue |
| 221 | Chloro | Hydrogen | $(CH_2)_2$—COO-phenyl | Hydrogen | Ethyl | Reddish blue |
| 222 | Chloro | Hydrogen | Hydrogen | $(CH_2)_2$—COO-benzyl | Methyl | Blue |
| 223 | Bromo | Hydrogen | $(CH_2)_2$—O—$CH_2$—(2-furfuryl) | $C_2H_4$ | Methyl | Blue |
| 224 | Bromo | Hydrogen | $CH_2$—COO—$CH_2$—(2-furfuryl) | $CH_2$—COO—$C_2H_5$ | Ethyl | Reddish blue |
| 225 | Chloro | Hydrogen | $(CH_2)_2$—COO—$CH_3$ | $(CH_2)_2$—COO—$CH_2$—(2-furfuryl) | Methyl | Reddish blue |
| 226 | Bromo | Hydrogen | Hydrogen | $CH(CH_3)$—$CH_2$—COO—$CH_3$ | Methyl | Blue |
| 227 | Bromo | Hydrogen | $CH(CH_3)$—$CH_2$—$OCH_3$ | Hydrogen | Methyl | Reddish blue |
| 228 | Bromo | Hydrogen | Hydrogen | $(CH_2)_2$—COO—$CH_2$—CO-phenyl | Methyl | Reddish blue |
| 229 | Bromo | Hydrogen | $(CH_2)_2$—OCO—$CH_3$ | $(CH_2)_2$—OCO—$CH_3$ | Methyl | Reddish blue |
| 230 | Bromo | Hydrogen | $(CH_2)_2$—OCO—$CH_3$ | $CH_2$-phenyl | Methyl | Blue |
| 231 | Chloro | Hydrogen | Hydrogen | $(CH_2)_2$—OCO—$CH_3$ | Methyl | Blue |
| 232 | Bromo | Hydrogen | $(CH_2)_2$—OCO-phenyl | Hydrogen | Ethyl | Reddish blue |
| 234 | Bromo | Hydrogen | $(CH_2)_2$—OCO-phenyl | $C_2H_4$ | Methyl | Blue |
| 235 | Bromo | Hydrogen | $(CH_2)_2$—CN | $(CH_2)_2$—CN | Methyl | Reddish blue |
| 236 | Chloro | Hydrogen | Hydrogen | $(CH_2)_2$—CN | Ethyl | Reddish blue |
| 237 | Bromo | Hydrogen | $(CH_2)_2$—COO—$CH_2$—CO-phenyl | $C_2H_5$ | Methyl | Blue |
| 238 | Bromo | Hydrogen | $(CH_2)_2$—COO—$CH_2$—CO—$CH_3$ | $CH_2$-phenyl | Methyl | Blue |
| 239 | Bromo | Hydrogen | Hydrogen | $(CH_2)_2$—COO—$CH_2$—CO—$CH_3$ | Methyl | Reddish blue |
| 240 | Bromo | Hydrogen | $C_2H_4$ | $CH_2$-phenyl | Methyl | Blue |
| 241 | Chloro | Hydrogen | Hydrogen | $CH_2$-phenyl | Methyl | Reddish blue |
| 242 | Bromo | Hydrogen | Hydrogen | $CH_3$ | Ethyl | Reddish blue |
| 243 | Bromo | Hydrogen | $C_2H_4$ | $C_2H_4$ | Methyl | Blue |
| 244 | Bromo | Hydrogen | $CH_2$—CH=$CH_2$ | $CH_2$—CH=$CH_2$ | Methyl | Blue |
| 245 | Bromo | Methoxy | $C_2H_4$ | $CH_2$-phenyl | Methyl | Greenish blue |
| 246 | Bromo | Methoxy | Hydrogen | $CH_2$-phenyl | Ethyl | Blue |
| 247 | Bromo | Methoxy | Hydrogen | $CH_3$ | Methyl | Blue |
| 248 | Bromo | Methoxy | $C_2H_4$ | $C_2H_4$ | Methyl | Greenish blue |
| 249 | Bromo | Ethoxy | $CH_2$-phenyl | $CH_2$—CH=$CH_2$ | Methyl | Greenish blue |
| 250 | Bromo | Methoxy | $CH_2$—CH=$CH_2$ | $CH_2$—CH=$CH_2$ | Methyl | Greenish blue |
| 251 | Bromo | Methoxy | $(CH_2)_2$—O—$CH_3$ | $(CH_2)_2$—O—$CH_3$ | Methyl | Greenish blue |
| 252 | Bromo | Methoxy | $(CH_2)_2$—O—$C_2H_5$ | $(CH_2)_2$—O—$C_2H_5$ | Ethyl | Greenish blue |
| 253 | Chloro | Ethoxy | Hydrogen | $(CH_2)_2$—O—$C_2H_5$ | Methyl , | Greenish blue |
| 254 | Bromo | Methoxy | $(CH_2)_2$—O-phenyl | $(CH_2)_2$—O-phenyl | Methyl | Greenish blue |
| 255 | Bromo | Methoxy | $C_2H_4$ | $(CH_2)_2$—O-phenyl | Methyl | Greenish blue |
| 256 | Bromo | Methoxy | Hydrogen | $(CH_2)_2$—O-phenyl | Ethyl | Blue |
| 257 | Chloro | Methoxy | $(CH_2)_2$—O-benzyl | $(CH_2)_2$—O-benzyl | Methyl | Greenish blue |
| 258 | Chloro | Ethoxy | $(CH_2)_2$—O-benzyl | $CH_3$ | Ethyl | Greenish blue |
| 259 | Chloro | Methoxy | $(CH_2)_2$—O-benzyl | Hydrogen | Methyl | Blue |
| 260 | Bromo | Methoxy | $(CH_2)_2$—O—$(CH_2)_3$—O—$CH_3$ | $(CH_2)_2$—O—$(CH_2)_3$—O—$CH_3$ | Methyl | Greenish blue |

| No: | X | R¹ | R³ | R⁴ | R⁵ | Shade on polyester |
|---|---|---|---|---|---|---|
| 261 | Bromo | Ethoxy | (CH₂)₂—O—(CH₂)₃—O—C₂H₅ | (CH₂)₂—O—(CH₂)₃—O—C₂H₅ | Methyl | Greenish blue |
| 262 | Bromo | Methoxy | CH₂—COO—CH₃ | CH₂—COO—CH₃ | Methyl | Blue |
| 263 | Bromo | Methoxy | CH₂-phenyl | CH₂—COO—CH₃ | Ethyl | Greenish blue |
| 264 | Bromo | Methoxy | C₂H₄ | CH₂—COO—CH₃ | Methyl | Greenish blue |
| 265 | Chloro | Methoxy | CH₂—COO—C₂H₅ | CH₂—COO—C₂H₅ | Methyl | Blue |
| 266 | Bromo | Methoxy | (CH₂)₂—COO—CH₃ | (CH₂)₂—COO—CH₃ | Methyl | Blue |
| 267 | Chloro | Ethoxy | (CH₂)₂—COO—C₂H₅ | (CH₂)₂—COO—C₂H₅ | Methyl | Blue |
| 268 | Bromo | Methoxy | (CH₂)₂—COO—CH₃ | C₂H₄ | Methyl | Greenish blue |
| 269 | Bromo | Methoxy | (CH₂)₂—COO—CH₃ | CH₂-phenyl | Methyl | Greenish blue |
| 270 | Bromo | Ethoxy | CH₃ | (CH₂)₂—COO—C₂H₅ | Methyl | Greenish blue |
| 271 | Chloro | Methoxy | Hydrogen | (CH₂)₂—COO—CH₃ | Methyl | Blue |
| 272 | Bromo | Methoxy | (CH₂)₂—COO-phenyl | Hydrogen | Ethyl | Blue |
| 273 | Bromo | Methoxy | (CH₂)₂—COO-phenyl | C₂H₄ | Methyl | Greenish blue |
| 274 | Bromo | Ethoxy | (CH₂)₂—COO-phenyl | (CH₂)₂—O—CH₃ | Methyl | Greenish blue |
| 275 | Chloro | Methoxy | (CH₂)₂—COO-phenyl | CH₂-phenyl | Methyl | Greenish blue |
| 276 | Chloro | Methoxy | Hydrogen | (CH₂)₂—COO-benzyl | Methyl | Blue |
| 278 | Chloro | Methoxy | CH₃ | (CH₂)₂—COO-benzyl | Ethyl | Greenish blue |
| 279 | Chloro | Methoxy | (CH₂)₂—CN | (CH₂)₂—COO-benzyl | Methyl | Blue |
| 280 | Bromo | Methoxy | (CH₂)₂—CN | (CH₂)₂—CN | Methyl | Blue |
| 281 | Chloro | Methoxy | Hydrogen | (CH₂)₂—CN | Ethyl | Blue |
| 282 | Bromo | Methoxy | (CH₂)₂—COO—CH₂—CO—CH₃ | C₂H₅ | Methyl | Greenish blue |
| 283 | Bromo | Methoxy | (CH₂)₂—COO—CH₂—CO—CH₃ | CH₂-phenyl | Methyl | Greenish blue |
| 284 | Bromo | Methoxy | Hydrogen | (CH₂)₂—COO—CH₂—CO—CH₃ | Methyl | Blue |
| 285 | Bromo | Methoxy | (CH₂)₂—COO—CH₂—CO—C₂H₅ | CH₃ | Methyl | Greenish blue |
| 286 | Bromo | Methoxy | (CH₂)₂—COO—CH₂—CO-phenyl | C₂H₅ | Methyl | Greenish blue |
| 287 | Bromo | Methoxy | Hydrogen | (CH₂)₂—COO—CH₂—CO-phenyl | Methyl | Blue |
| 288 | Bromo | Ethoxy | (CH₂)₂—COO—CH₂—CO-benzyl | C₂H₅ | Methyl | Greenish blue |
| 289 | Chloro | Methoxy | Hydrogen | (CH₂)₂—COO—CH₂—CO-benzyl | Methyl | Blue |
| 290 | Bromo | Methoxy | (CH₂)₂—OCO—CH₃ | (CH₂)₂—OCO—CH₃ | Methyl | Blue |
| 291 | Chloro | Methoxy | (CH₂)₂—OCO—C₂H₅ | (CH₂)₂—OCO—C₂H₅ | Methyl | Blue |
| 292 | Bromo | Methoxy | (CH₂)₂—OCO—CH₃ | C₂H₄ | Methyl | Greenish blue |
| 293 | Bromo | Methoxy | (CH₂)₂—OCO—CH₃ | CH₂-phenyl | Methyl | Greenish blue |
| 294 | Bromo | Ethoxy | Hydrogen | (CH₂)₂—OCO—CH₃ | Ethyl | Blue |
| 295 | Bromo | Methoxy | (CH₂)₂—OCO-phenyl | Hydrogen | Methyl | Blue |
| 296 | Bromo | Methoxy | (CH₂)₂—OCO-phenyl | C₂H₄ | Methyl | Greenish blue |
| 297 | Chloro | Methoxy | (CH₂)₂—OCO-phenyl | (CH₂)₂—O—CH₃ | Methyl | Greenish blue |
| 298 | Bromo | Methoxy | (CH₂)₂—O—CH₂—(2-furfuryl) | CH₂-phenyl | Methyl | Greenish blue |
| 299 | Bromo | Methoxy | (CH₂)₂—O—CH₂—(2-furfuryl) | C₂H₄ | Methyl | Greenish blue |
| 300 | Bromo | Methoxy | (CH₂)₂—O—CH₂—(2-furfuryl) | (CH₂)₂—COO—C₂H₅ | Methyl | Greenish blue |
| 301 | Bromo | Methoxy | CH₂—COO—CH₂—(2-furfuryl) | CH₂—COO—C₂H₅ | Methyl | Blue |
| 302 | Bromo | Methoxy | (CH₂)₂—COO—CH₃ | (CH₂)₂—COO—CH₂—(2-furfuryl) | Methyl | Blue |
| 303 | Bromo | Methoxy | Hydrogen | CH(CH₃)—CH₂—COO—CH₃ | Methyl | Blue |
| 304 | Chloro | Methoxy | CH(CH₃)—CH₂—O—CH₃ | Hydrogen | Methyl | Blue |
| 305 | Chloro | Methoxy | Hydrogen | CH(CH₃)—CH₂—O—C₂H₅ | Methyl | Blue |
| 306 | Chloro | Methoxy | CH(CH₃)—CH₂—COO—CH₂—CO—CH₃ | Hydrogen | Methyl | Blue |
| 307 | Bromo | Methoxy | CH(CH₃)—CH₂—COO—CH₂—CO—CH₃ | CH₂-phenyl | Ethyl | Greenish blue |
| 308 | Bromo | Methoxy | Hydrogen | CH(CH₃)—CH₂—COO—CH₂—CO-phenyl | Methyl | Blue |
| 309 | Bromo | Methoxy | CH(CH₃)—CH₂—OCO—CH₃ | Hydrogen | Methyl | Blue |
| 310 | Bromo | Methoxy | CH(CH₃)—CH₂—OCO—C₂H₅ | C₂H₄ | Methyl | Greenish blue |
| 311 | Bromo | Methoxy | Hydrogen | CH(CH₃)—CH₂—OCO-phenyl | Methyl | Blue |
| 312 | Bromo | Methoxy | CH(CH₃)—CH₂—COO—CH₂—CO—CH₃ | Hydrogen | Methyl | Blue |

The invention claimed is:

1. A dye of formula (I)

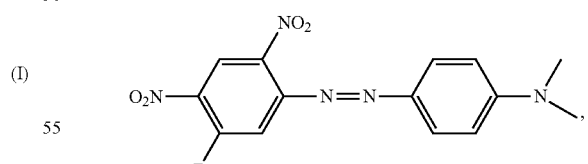

wherein
X is hydrogen and
K is an aromatic or heteroaromatic coupling component with the proviso that K is not a naphthyl radical,
and wherein the following dyes a) and b) are excluded:

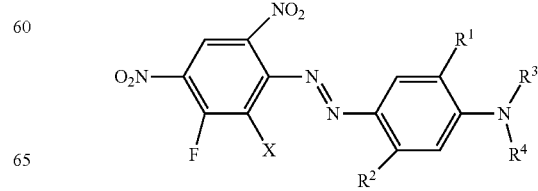

wherein
X is hydrogen, $R^1$ is $C_1$ alkoxy, $R^2$ is acylamino, and $R^3$ and $R^4$ are $C_2H_4CN$.

2. The dye according to claim 1, wherein
K is selected from the group consisting of N-heterocyclic fused ring system and a phenol radical, each of which may be unsubstituted or substituted.

3. The dye according to claim 2, wherein K is selected from the group consisting of aminobenzene, quinolone and a phenol-radical, each of which is optionally substituted.

4. The dye according to claim 1, wherein
K is a radical of formula (2)

$$\text{(2)}$$

wherein independent from each other
$R^1$ is hydrogen, unsubstituted or substituted $C_1$-$C_4$-alkyl, unsubstituted or substituted $C_1$-$C_4$-alkoxy, chloro, bromo, benzyloxy or $O—(CH_2)_n$-$A^1$-$C_1$-$C_4$-alkyl,
$R^2$ is hydrogen, hydroxyl, unsubstituted or substituted $C_1$-$C_4$-alkyl, unsubstituted $C_1$-$C_4$-alkoxy, chloro, bromo, acyloxy, acylamino or alkylsulfonylamino,
wherein n is 1 to 4 and A' is O, O—CO, O—CO—O or CO—O and
wherein at least one $R^1$ or $R^2$ is not hydrogen, and
$R^3$ and $R^4$ is unsubstituted or substituted $C_1$-$C_4$-alkyl, unsubstituted or substituted phenyl, unsubstituted or substituted benzyl,
or $R^1$ and $R^3$ together form a 5- or 6-membered aliphatic, heteroaliphatic, aromatic or heteroaromatic ring,
which 5- or 6-membered ring is unsubstituted or substituted and
$R^3$ and $R^4$ are not both $C_2H_4CN$,
and wherein the dye:

is excluded.

5. The dye according to claim 1 having formula (II)

$$\text{(II)}$$

wherein independent of each other
X is hydrogen,
$R^1$ is hydrogen, hydroxyl, $C_1$-$C_4$-alkyl, bromo, chloro or $C_1$-$C_4$-alkoxy,
$R^2$ is hydrogen, hydroxyl, carboxy, $C_1$-$C_4$-alkyl, $C_1$-$C_4$-alkoxy, halogen, acyloxy, acylamino or sulfonylamino, wherein at least one $R^1$ or $R^2$ is not hydrogen,
$R^3$ and $R^4$ is hydrogen, $C_1$-$C_4$-alkyl, $(CH_2)_n$-phenyl, $CH_2—CH=CH_2$, $(CH_2)_n—OH$, $(CH_2)_n—O—(C_1$-$C_4)$-alkyl, $(CH_2)_n—O$-phenyl, $(CH_2)_n$—O-benzyl, $(CH_2)_n—O—(CH_2)_m—OH$, $(CH_2)_n—O—(CH_2)_m—O—(C_1$-$C_4)$-alkyl, $(CH_2)_n—O—(CH_2)_m$—O-phenyl, $(CH_2)_n—O—(CH_2)_n$—O-benzyl, $(CH_2)_n—COOH$, $(CH_2)_n—COO—(C_1$-$C_4)$-alkyl, $(CH_2)_n$—COO-phenyl, $(CH_2)_n$—COO-benzyl, $(CH_2)_n—COO(CH_2)_m—CO—(C_1$-$C_4)$-alkyl, $(CH_2)_n—COO(CH_2)_m$—CO-phenyl, $(CH_2)_n—COO(CH_2)_m$—CO-benzyl, $(CH_2)_n—O—CO—(C_1$-$C_4)$-alkyl, $(CH_2)_n—O$—CO-phenyl, $(CH_2)_n—O$—CO-benzyl, $COO—(CH_2)_n$-2-furfuryl, $COO—(CH_2)_n$-2-dehydropyranyl, $(CH_2)_m—O—(CH_2)_n$-2-furfuryl, $(CH_2)_m—O—(CH_2)_n$-2-dehydropyranyl, $CHR^2—(CH_2)_p—(C_1$-$C_4)$-alkyl, $CHR^2—(CH_2)_p$ phenyl, $CHR^2—CH=CH_2$, $CHR^2—(CH_2)_p—OH$, $CHR^2—(CH_2)_p—O—(C_1$-$C_4)$-alkyl, $CHR^2—(CH_2)_p$—O-phenyl, $CHR^2—(CH_2)_p$—O-benzyl, $CHR^2—(CH_2)_p—O—(CH_2)_m—OH$, $CHR^2—(CH_2)_p—O—(CH_2)_m—OH$, $CHR^2—(CH_2)_p—O—(CH_2)_m—O—(C_1$-$C_4)$-alkyl, $CHR^2—(CH_2)_p—O—(CH_2)_m$-O-phenyl, $CHR^2—(CH_2)_p—O—(CH_2)_m$—O-benzyl, $CHR^2—(CH_2)_p—COOH$, $CHR^2—(CH_2)_p—COO—(C_1$-$C_4)$-alkyl, $CHR^2—(CH_2)_p$—COO-phenyl, $CHR^2—(CH_2)_p$—COO-benzyl, $CHR^2—(CH_2)_p—COO(CH_2)_m—CO—(C_1$-$C_4)$-alkyl, $CHR^2—(CH_2)_p—COO(CH_2)_m$—CO-phenyl, $CHR^2—(CH_2)_p—COO(CH_2)_m$—CO-benzyl, $(CH_2)_n—COO(CH_2)_p—(CHR^2)_m —CO—(C_1$-$C_4)$-alkyl, $(CH_2)_n—O—(CH_2)_p—(CHR^2)_m—O—(C_1$-$C_4)$-alkyl, $(CH_2)_n—O—(CH_2)_p—(CHR^2)_n$—O-phenyl, $(CH_2)_n—O—(CH_2)_p—(CHR^2)_m$—O-benzyl, $CHR^2—(CH_2)_p—O—CO—(C_1$-$C_4)$-alkyl, $CHR^2—(CH_2)_p—O$—CO-phenyl, $CHR^2—(CH_2)_p—O$—CO-benzyl, $COO—CHR^2—(CH_2)_p$-2-furfuryl, $COO—CHR^2—(CH_2)_p$-2-dehydropyranyl, $CHR^2—(CH_2)_p—O—(CH_2)_n$-2-furfuryl, $CHR^2—(CH_2)_p—O—(CH_2)_n$-2-dehydropyranyl,
whereby all benzyl and phenyl rings can be substituted by $C_1$-$C_4$-alkyl, $C_1$-$C_4$-alkoxy, halogen, nitro, cyano or $COOR^2$,
n is 1 to 4,
m is 1 to 4 and
p is 0 to 3.

6. The dye according to claim 5, having formula (II) wherein independent from each other
X is hydrogen,
$R^1$ is hydrogen, methyl or methoxy,
$R^2$ is hydrogen, hydroxy, COOH, $COO—C_1$-$C_2$-alkyl, $C_1$-$C_2$-alkyl, $C_1$-$C_2$-alkoxy, chloro, bromo, —NHCO—$C_1$-$C_2$-alkyl, —NHCO-aryl, —NHCO-benzyl, —$NHSO_2$—$C_1$-$C_2$-alkyl or —$NHSO_2$-aryl, and
wherein at least one $R^1$ or $R^2$ is not hydrogen,
$R^3$ and $R^4$ is hydrogen, $C_1$-$C_2$-alkyl, $(CH_2)$-phenyl, $CH_2—CH=CH_2$, $(CH_2)_2—O—(C_1$-$C_2)$-alkyl, $(CH_2)_2$—O-phenyl, $(CH_2)_2$—O-benzyl, $(CH_2)_2—O—(CH_2)_m—O—(C_1$-$C_2)$-alkyl, $(CH_2)_2—O—(CH_2)_n$—O-phenyl, $(CH_2)_2—O—(CH_2)_m$—O-benzyl, $(CH_2)_n—COO—(C_1$-$C_2)$-alkyl, $(CH_2)_n$—COO-phenyl, $(CH_2)_n$—COO-benzyl, $(CH_2)_n—COO(CH_2)_m—CO—(C_1$-$C_2)$-alkyl, $(CH_2)_n—COO(CH_2)_m$—CO-phenyl, $(CH_2)_n—COO(CH_2)_m$—CO-benzyl, $(CH_2)_n—O—CO—(C_1$-$C_2)$-alkyl, $(CH_2)_n—O$—CO-phenyl, $(CH_2)_n—O$—CO-benzyl, $COO—(CH_2)_n$-2-furfuryl, $COO—(CH_2)_n$-

2-dehydropyranyl, $(CH_2)_m$—O—$(CH_2)_n$-2-furfuryl, $(CH_2)_n$—O—$(CH_2)_n$-2-dehydropyranyl, $CHR^2$—$CH=CH_2$, $CHR^2$—$(CH_2)_p$—O—$(C_1$-$C_2)$-alkyl, $CHR^2$—$(CH_2)_p$—O-phenyl, $CHR^2$—$(CH_2)_p$—O-benzyl, $CHR^2$—$(CH_2)_p$—O—$(CH_2)_m$—O—$(C_1$-$C_2)$-alkyl, $CHR^2$—$(CH_2)_p$—O—$(CH_2)_m$—O-phenyl, $CHR^2$—$(CH_2)_p$—O—$(CH_2)_m$—O-benzyl, $CHR^2$—$(CH_2)_p$—COO—$(C_1$-$C_2)$-alkyl, $CHR^2$—$(CH_2)_p$—COO-phenyl, $CHR^2$—$(CH_2)_p$—COO-benzyl, $CHR^2$—$(CH_2)_p$—COO$(CH_2)_m$—CO—$(C_1$-$C_2)$-alkyl, $CHR^2$—$(CH_2)_p$—COO$(CH_2)_m$—CO-phenyl, $CHR^2$—$(CH_2)_p$—COO$(CH_2)_m$—CO-benzyl, $CHR^2$—$(CH_2)_p$—O—CO—$(C_1$-$C_2)$-alkyl, $CHR^2$—$(CH_2)_p$—O—CO-phenyl or $CHR^2$—$(CH_2)_p$—O—CO-benzyl, n is 1 or 2,
m is 1 or 2 and
p is 0 or 1.

7. The dye according to claim 5, having formula (II) wherein independent from each other
X is hydrogen,
$R^1$ is hydrogen, methyl or methoxy,
$R^2$ is hydrogen, hydroxy, COOH, COO—$(C_1$-$C_2)$-alkyl, $(C_1$-$C_2)$-alkyl, chloro, bromo, NHCO—$(C_1$-$C_2)$-alkyl, $NHSO_2$—$(C_1$-$C_2)$-alkyl, and
wherein at least one $R^1$ or $R^2$ is not hydrogen,
$R^3$ and $R^4$ is hydrogen, $C_1$-$C_2$-alkyl, $(CH_2)$-phenyl, $CH_2$—$CH=CH_2$, $(CH_2)_2$—O—$(C_1$-$C_2)$-alkyl, $(CH_2)_2$—O-phenyl, $(CH_2)_2$—O-benzyl, $(CH_2)_2$—O—$(CH_2)_m$—O—$(C_1$-$C_2)$-alkyl, $(CH_2)_n$—COO—$(C_1$-$C_2)$-alkyl, $(CH_2)_n$—COO-phenyl, $(CH_2)_n$—COO-benzyl, $(CH_2)_n$—COO$(CH_2)_m$—CO—$(C_1$-$C_2)$-alkyl, $(CH_2)_n$—COO$(CH_2)_m$—CO-phenyl, $(CH_2)_n$—O—CO—$(C_1$-$C_2)$-alkyl, $(CH_2)_n$—O—CO-phenyl, COO—$(CH_2)_n$-2-furfuryl, $(CH_2)_m$—O—$(CH_2)_n$-2-furfuryl, $CHR^2$—$(CH_2)_p$—COO—$(C_1$-$C_2)$-alkyl, $CHR^2$—$(CH_2)_p$—O—$(C_1$-$C_2)$-alkyl, $CHR^2$—$(CH_2)_p$—COO$(CH_2)_p$—CO—$(C_1$-$C_2)$-alkyl, $CHR^2$—$(CH_2)_p$—COO$(CH_2)_m$—CO-phenyl, $CHR^2$—$(CH_2)_p$—O—CO—$(C_1$-$C_2)$-alkyl or $CHR^2$—$(CH_2)_p$—O—CO-phenyl, n is 1 or 2,
m is 1 or 2 and
p is 0 or 1.

8. The dye according to claim 1, having formula (III)

(III)

wherein independent from each other
X is hydrogen,
$R^1$ is hydrogen, $C_1$-$C_4$-alkyl, bromo, chloro or $C_1$-$C_4$-alkoxy,
$R^5$ is hydrogen or $C_1$-$C_4$-alkyl,
$R^3$ and $R^4$ is hydrogen, $C_1$-$C_4$-alkyl, $(CH_2)_n$-phenyl, $CH_2$—$CH=CH_2$, $(CH_2)_n$—OH, $(CH_2)_n$—O—$(C_1$-$C_4)$-alkyl, $(CH_2)_n$—O-phenyl, $(CH_2)_n$—O-benzyl, $(CH_2)_n$—O—$(CH_2)_m$—OH, $(CH_2)_n$—O—$(CH_2)_m$—O—$(C_1$-$C_4)$-alkyl, $(CH_2)_n$—O—$(CH_2)_m$—O-phenyl, $(CH_2)_n$—O—$(CH_2)_m$—O-benzyl, $(CH_2)_n$—COOH, $(CH_2)_n$—COO—$(C_1$-$C_4)$-alkyl, $(CH_2)_n$—COO-phenyl, $(CH_2)_n$—COO-benzyl, $(CH_2)_n$—COO$(CH_2)_m$—CO—$(C_1$-$C_4)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1$-$C_4)$-alkyl, $(CH_2)_n$—O—CO-phenyl, $(CH_2)_n$—O—CO-benzyl, COO—$(CH_2)_n$-2-furfuryl, COO—$(CH_2)_n$-2-dehydropyranyl, $(CH_2)_m$—O—$(CH_2)_n$-2-furfuryl, $(CH_2)_m$—O—$(CH_2)_n$-2-dehydropyranyl, $CHR^2$—$(CH_2)_p$—$(C_1$-$C_4)$-alkyl, $CHR^2$—$(CH_2)_p$- phenyl, $CHR^2$—$CH=CH_2$, $CHR^2$—$(CH_2)_p$—OH, $CHR^2$—$(CH_2)_p$—O—$(C_1$-$C_4)$-alkyl, $CHR^2$—$(CH_2)_p$—O-phenyl, $CHR^2$—$(CH_2)_p$—O-benzyl, $CHR^2$—$(CH_2)_p$—O—$(CH_2)_m$—OH, $CHR^2$—$(CH_2)_p$—O—$(CH_2)_m$—OH, $CHR^2$—$(CH_2)_p$—O—$(CH_2)_m$—O—$(C_1$-$C_4)$-alkyl, $CHR^2$—$(CH_2)_p$—O—$(CH_2)_m$—O-phenyl, $CHR^2$—$(CH_2)_p$—O—$(CH_2)_m$—O-benzyl, $CHR^2$—$(CH_2)_p$—COOH, $CHR^2$—$(CH_2)_p$—COO—$(C_1$-$C_4)$-alkyl, $CHR^2$—$(CH_2)_p$—COO-phenyl, $CHR^2$—$(CH_2)_p$—COO-benzyl, $CHR^2$—$(CH_2)_p$—COO$(CH_2)_m$—CO—$(C_1$-$C_4)$-alkyl, $CHR^2$—$(CH_2)_p$—COO$(CH_2)_m$—CO-phenyl, $CHR^2$—$(CH_2)_p$—COO$(CH_2)_m$—CO-benzyl, $(CH_2)_n$—COO$(CH_2)_p$—$(CHR^2)_m$ CO—$(C_1$-$C_4)$-alkyl, $(CH_2)_n$—O—$(CH_2)_p$—$(CHR^2)_m$—O—$(C_1$-$C_4)$-alkyl, $(CH_2)_n$—O—$(CH_2)_p$—$(CHR^2)_m$—O-phenyl, $(CH_2)_n$—O—$(CH_2)_p$—$(CHR^2)_m$—O-benzyl, $CHR^2$—$(CH_2)_p$—O—CO—$(C_1$-$C_4)$-alkyl, $CHR^2$—$(CH_2)_p$—O—CO-phenyl, $CHR^2$—$(CH_2)_p$—O—CO-benzyl, COO— $CHR^2$—$(CH_2)_p$-2-furfuryl, COO—$CHR^2$—$(CH_2)_p$-2-dehydropyranyl, $CHR^2$—$(CH_2)_p$—O—$(CH_2)_n$-2-furfuryl or $CHR^2$—$(CH_2)_p$—O—$(CH_2)_n$-2-dehydropyranyl, whereby all benzyl and phenyl rings can be substituted by $(C_1$-$C_4)$-alkyl, $(C_1$-$C_4)$-alkoxy, halogen, nitro, or $COOR^2$, n is 1 to 4,
m is 1 to 4 and
p is 0 to 3.

9. A process for the production of the dye of formula (I) and mixtures thereof (I)

comprising:
a) diazotizing (IV)

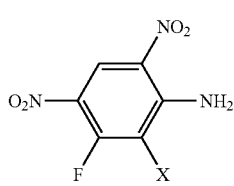

wherein X is defined as in claim 1 and
b) coupling the diazonium salt obtained in step a) with compounds of formula (2)

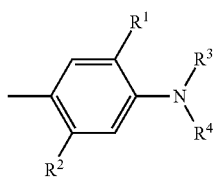

wherein $R^1$ is hydrogen, unsubstituted or substituted $C_1$-$C_4$-alkyl, unsubstituted or substituted $C_1$-$C_4$-alkoxy, chloro, bromo, benzyloxy or O—$(CH_2)_n$-$A^1$-$C_1$-$C_4$-alkyl, $R^2$ is hydrogen, hydroxyl, unsubstituted or substituted $C_1$-$C_4$-alkyl, unsubstituted $C_1$-$C_4$-alkoxy, chloro, bromo, acyloxy, acylamino or alkylsulfonylamino, wherein n is 1 to 4 and $A^1$ is O, O—CO, O—CO—O or CO—O and $R^3$ and $R^4$ is unsubstituted or substituted $C_1$-$C_4$-alkyl, unsubstituted or substituted phenyl, unsubstituted or substituted benzyl or $R^1$ and $R^3$ together form a 5- or 6-membered aliphatic, heteroaliphatic, aromatic or heteroaromatic ring, which 5- or 6-membered ring is unsubstituted or substituted.

10. A chemical composition comprising one or more dye(s) according to claim 1.

11. A chemical composition consisting of two or more dyes according to claim 1.

12. An aqueous dispersion for dying comprising one or more dyes according to claim 1.

13. A process for dyeing or printing hydrophobic materials with the dye according to claim 1.

14. An ink for digital textile printing comprising the dye according to claim 1.

15. A process for dying fibers which comprises contacting the fibers with the dye according to claim 1, wherein the fibres are selected from the group consisting of: synthetic fiber materials, nylon materials, nylon-6, nylon-6,6, aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers and Lyocell fibers.

16. Fiber and blends comprising a fiber selected from the group consisting of: synthetic fiber materials, nylon materials, nylon-6, nylon-6,6, aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers, and Lyocell fibers and comprising one or more dye(s) according to claim 1 either in chemically and/or physically bound form.

17. A dye of formula (III)

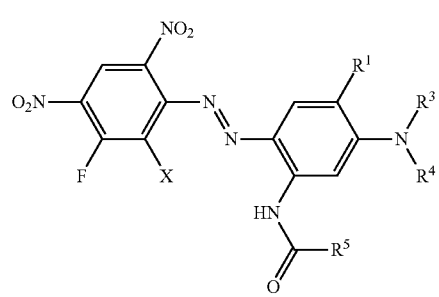

wherein independent from each other
X is hydrogen,
$R^1$ is hydrogen, methyl or methoxy,
$R^5$ is methyl or ethyl,
$R^3$ and $R^4$ is hydrogen, $C_1$-$C_2$-alkyl, $(CH_2)$-phenyl, $CH_2$—$CH$=$CH_2$, $(CH_2)_2$—O—$(C_1$-$C_2)$-alkyl, $(CH_2)_2$—O-phenyl, $(CH_2)_2$—O-benzyl, $(CH_2)_2$—O—$(CH_2)_m$—O—$(C_1$-$C_2)$-alkyl, $(CH_2)_2$—O—$(CH_2)_m$—O-phenyl, $(CH_2)_2$—O—$(CH_2)_m$—O-benzyl, $(CH_2)_n$—COO—$(C_1$-$C_2)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1$-$C_2)$-alkyl, $(CH_2)_n$—COO$(CH_2)_m$—CO-phenyl, $(CH_2)_n$—COO$(CH_2)_m$—CO-benzyl, $(CH_2)_n$—O—CO—$(C_1$-$C_2)$-alkyl, $(CH_2)_n$—O—CO-phenyl, $(CH_2)_n$—O—CO-benzyl, COO—$(CH_2)_n$-2-furfuryl, COO—$(CH_2)_n$-2-dehydropyranyl, $(CH_2)_m$—O—$(CH_2)_n$-2-furfuryl, $(CH_2)_m$—O—$(CH_2)_n$-2-dehydropyranyl, $CHR^2$—$CH$=$CH_2$, $CHR^2$—$(CH_2)_p$—O—$(C_1$-$C_2)$-alkyl, $CHR^2$—$(CH_2)_p$—O-phenyl, $CHR^2$—$(CH_2)_p$—O-benzyl, $CHR^2$—$(CH_2)_p$—O—$(CH_2)_m$—O—$(C_1$-$C_2)$-alkyl, $CHR^2$—$(CH_2)_p$—O—$(CH_2)_m$—O-phenyl, $CHR^2$—$(CH_2)_p$—O—$(CH_2)_m$—O-benzyl, $CHR^2$—$(CH_2)_p$—COO—$(C_1$-$C_2)$-alkyl, $CHR^2$—$(CH_2)_p$—COO-phenyl, $CHR^2$—$(CH_2)_p$—COO-benzyl, $CHR^2$—$(CH_2)_p$—CN, $CHR^2$—$(CH_2)_p$—COO$(CH_2)_m$—CO—$(C_1$-$C_2)$-alkyl, $CHR^2$—$(CH_2)_p$—COO$(CH_2)_m$—CO-phenyl, $CHR^2$—$(CH_2)_p$—COO$(CH_2)_m$—CO-benzyl, $CHR^2$—$(CH_2)_p$—O—CO—$(C_1$-$C_2)$-alkyl, $CHR^2$—$(CH_2)_p$—O—CO-phenyl or $CHR^2$—$(CH_2)_p$—O—CO-benzyl, n is 1 or 2,
m is 1 or 2 and
p is 0 or 1.

18. A chemical composition comprising one or more dye(s) according to claim 17.

19. A chemical composition consisting of two or more dyes according to claim 17.

20. An aqueous dispersion for dying comprising one or more dyes according to claim 17.

21. A process for dyeing or printing hydrophobic materials with the dye according to claim 17.

22. An ink for digital textile printing comprising the dye according to claim 17.

23. A process for dying fibers which comprises contacting the fibers with the dye according to claim 17, wherein the fibres are selected from the group consisting of: synthetic fiber materials, nylon materials, nylon-6, nylon-6,6, aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers and Lyocell fibers.

24. A dye of formula (III)

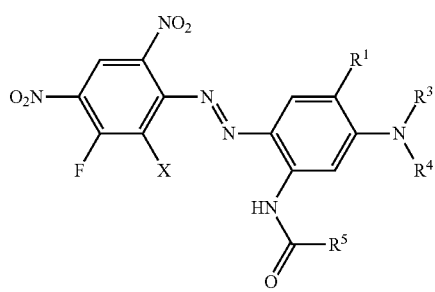

(III)

wherein independent from each other
X is hydrogen,
$R^1$ is hydrogen, methyl or methoxy,
$R^5$ is methyl,
$R^3$ and $R^4$ is hydrogen, $C_1$-$C_2$-alkyl, $(CH_2)$-phenyl, $CH_2$—$CH$=$CH_2$, $(CH_2)_2$—O—$(C_1$-$C_2)$-alkyl, $(CH_2)_2$—O-phenyl, $(CH_2)_2$—O-benzyl, $(CH_2)_2$—O—$(CH_2)_m$—O—$(C_1$-$C_2)$-alkyl, $(CH_2)_n$—COO—$(C_1$-$C_2)$-alkyl, $(CH_2)_n$—COO-phenyl, $(CH_2)_n$—COO-benzyl, $(CH_2)_n$—CN, $(CH_2)_n$—COO$(CH_2)_m$—CO—$(C_1$-$C_2)$-alkyl, $(CH_2)_n$—COO$(CH_2)_m$—CO-phenyl, $(CH_2)_n$—O—CO—$(C_1$-$C_2)$-alkyl, $(CH_2)_n$—O—CO-phenyl, COO—$(CH_2)_n$-2-furfuryl, $(CH_2)_m$—O—$(CH_2)_n$-2-furfuryl, $CHR^2$—$(CH_2)_p$—COO—$(C_1$-$C_2)$-alkyl, $CHR^2$—$(CH_2)$—O—$(C_1$-$C_2)$-alkyl, $CHR^2$—$(CH_2)_p$—COO$(CH_2)_p$—CO—$(C_1$-$C_2)$-alkyl, $CHR^2$—$(CH_2)_p$—COO$(CH_2)_m$—CO-phenyl, $CHR^2$—$(CH_2)_p$—O—CO—$(C_1$-$C_2)$-alkyl or $CHR^2$—$(CH_2)_p$O—CO-phenyl,
n is 1 or 2,
m is 1 or 2 and
p is 0 or 1.

25. Fiber and blends comprising a fiber selected from the group consisting of: synthetic fiber materials, nylon materials, nylon-6, nylon-6,6, aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers, and Lyocell fibers and comprising one or more dye(s) according to claim 17 either in chemically and/or physically bound form.

26. A chemical composition comprising one or more dye(s) according to claim 24.

27. A chemical composition consisting of two or more dyes according to claim 24.

28. An aqueous dispersion for dying comprising one or more dyes according to claim 24.

29. A process for dyeing or printing hydrophobic materials with the dye according to claim 24.

30. An ink for digital textile printing comprising the dye according to claim 24.

31. A process for dying fibers which comprises contacting the fibers with the dye according to claim 24, wherein the fibres are selected from the group consisting of: synthetic fiber materials, nylon materials, nylon-6, nylon-6,6, aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers and Lyocell fibers.

32. Fiber and blends comprising a fiber selected from the group consisting of: synthetic fiber materials, nylon materials, nylon-6, nylon-6,6, aramid fibres, vegetable fibres, seed fibres, cotton, organic cotton, kapok, coir from coconut husk; bast fibers, flax, hemp, jute, kenaf, ramie, rattan; leaf fibres, sisal, henequen, banana; stalk fibres, bamboo; fibres from animals, wool, organic wool, silk, cashmere wool, alpaca fiber, mohair, Angora fibre as well as fur and leather materials; manufactured, regenerated and recycled fibres, cellulosic fibres; paper fibres, cellulosic regenerated fibres, viscose rayon fibres, acetate and triacetate fibers, and Lyocell fibers and comprising one or more dye(s) according to claim 24 either in chemically and/or physically bound form.

* * * * *